United States Patent
Kano

(10) Patent No.: US 7,133,358 B2
(45) Date of Patent: Nov. 7, 2006

(54) FAILURE CONTROL UNIT

(75) Inventor: Shinya Kano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 966 days.

(21) Appl. No.: 10/092,408

(22) Filed: Mar. 6, 2002

(65) Prior Publication Data

US 2002/0172150 A1 Nov. 21, 2002

(30) Foreign Application Priority Data

May 17, 2001 (JP) ............................. 2001-147549

(51) Int. Cl.
*H04L 12/26* (2006.01)
*G06F 11/07* (2006.01)

(52) U.S. Cl. ..................................... 370/221
(58) Field of Classification Search ...................... None
See application file for complete search history.

(56) References Cited

U.S. PATENT DOCUMENTS

| | | | | |
|---|---|---|---|---|
| 5,003,531 | A * | 3/1991 | Farinholt et al. | 370/223 |
| 5,159,595 | A * | 10/1992 | Flanagan et al. | 370/224 |
| 6,532,088 | B1 * | 3/2003 | Dantu et al. | 398/43 |
| 6,535,481 | B1 * | 3/2003 | Andersson et al. | 370/225 |
| 6,711,125 | B1 * | 3/2004 | Walrand et al. | 370/223 |
| 2003/0021225 | A1 * | 1/2003 | Klink | 370/222 |

FOREIGN PATENT DOCUMENTS

JP 2000-138711 5/2000

OTHER PUBLICATIONS

Rosen et al, RFC 3031: Multiprotocol Label Switching Archtecture, Jan. 2001, The Internet Society.*

* cited by examiner

*Primary Examiner*—Chau Nguyen
*Assistant Examiner*—Jordan Hamann
(74) *Attorney, Agent, or Firm*—Katten Muchin Rosenman LLP

(57) ABSTRACT

A transmission unit and a failure recovery method with failure recover functions, which use limited network resources efficiently. A label table manager manages a label table which associates incoming labels related to incoming transmission data with outgoing labels related to outgoing transmission data. Based on the label table, a transmission controller performs label-switching of transmission data. A path set-up unit establishes a loop-shaped protection path that includes a part or whole of transmission links of an existing working path and would allow transmission data to flow in the opposite direction to that of the working path. When a failure occurs, a failure recovery controller changes the association between the incoming and outgoing labels stored in the label table and switches the failed part of the working path to the loop-shaped protection path, thereby restoring the label-switched network.

13 Claims, 24 Drawing Sheets

FAILURE CONTROL UNIT

BACKGROUND OF THE INVENTION

1. Field of the Invention

The present invention relates to a transmission unit and a failure recovery method. More particularly, the present invention relates to a transmission unit which has the capability of recovering from failure, and to a failure recovery method for that purpose.

2. Description of the Related Art

Recent years have seen an increasing amount of packet traffic because of the expanding use of the Internet. In today's Internet Protocol (IP) networks, the packets carry various types of information, from ordinary computer data to delay-sensitive realtime voice and video streams. To address the requirements for packet transport with smaller delays, a new traffic engineering protocol called "label switching" has been proposed. Label is a short fixed-length value that is attached to packets at the ingress node to specify a path to a particular destination. Without using ordinary layer-3 (network layer) routers, label-switched networks transport labeled packets over a layer-2 path that is previously defined for each destination. That is, the label switching mechanism enables fast packet delivery by eliminating upper-layer routing procedures. This new technology, called the multiprotocol label switching (MPLS) protocol, is currently under standardization by the Internet Engineering Task Force (IETF).

To ensure a high level of network availability, MPLS networks employ a failure recovery mechanism called "local repair," for example. FIGS. 22 to 24 show a failure recovery process with local repair techniques. The illustrated network is constructed with a plurality of local switch routers (LSRs). Six LSRs 202 to 205, 207, and 208 are connected circularly, and two LSRs 201 and 206 are linked to the LSRs 202 and 205, respectively.

Suppose here that an end-to-end working path W is established between two LSRs 201 and 206 as shown in FIG. 22. Packets originating from the ingress LSR 201 are delivered to the egress LSR 206, being label-switched at each intermediate LSR on the working path W as follows:

LSR 201→LSR 202→LSR 203→LSR 204→LSR 205→LSR 206

Protection paths p1 to p3 are provided to make this connection tolerant of possible failure with the links L1 to L3 along the path W. Those paths p1 to p3 would detour packets around the links L1 to L3, respectively. In the event that one of those links is disrupted, two LSRs located at both ends of that link would reconfigure themselves to activate an appropriate protection path, thereby recovering from the link failure.

Referring to FIG. 23, suppose, for example, that the working path W has failed somewhere on the link L2. Upon detection of the problem, the LSRs 203 and 204 switch the failed link L2 to the protection path p2. Accordingly, a new packet route is established as follows:

LSR 201→LSR 202→LSR 203 (loopback)→LSR 202→LSR 207→LSR 208→LSR 205→LSR 204 (loopback)→LSR 205→LSR 206

Packets are label-switched at each LSR on this new working path Wa, and finally reach the destination LSR 206 as shown in FIG. 24.

The above-described conventional failure recovery technique, however, requires a lot of network resources to be allocated previously for protection purposes. In the example of FIGS. 22 to 24 discussed above, three protection paths p1 to p3 have to be reserved for one working path W, to provide an alternative route that detours around the link L1 to L3 in case of failure. This is very inefficient in terms of resource usage. While it surely contributes to the improved availability of networks, the conventional protection method causes a problem in operability and usability of communication services.

SUMMARY OF THE INVENTION

In view of the foregoing, it is an object of the present invention to provide a transmission unit which performs failure recovery processing efficiently using limited network resources.

It is another object of the present invention to provide a failure recovery method which enables a network to recover from failure, efficiently using limited resources.

To accomplish the first object, according to the present invention, there is provided a transmission unit with failure recovery functions. This transmission unit comprises the following elements: a label table manager which manages a label table which associates incoming labels related to incoming transmission data with outgoing labels related to outgoing transmission data; a transmission controller which controls label-switched routing of the incoming transmission data, based on the label table; a path set-up unit which establishes a loop-shaped protection path that includes a part or whole of transmission links of an existing working path and would allow transmission data to flow in the opposite direction to that of the working path; and a failure recovery controller which executes a failure recovery process when a failure occurs on the working path, by changing the association between the incoming and outgoing labels stored in the label table, so as to switch the failed part of the working path to the loop-shaped protection path.

Further, to accomplish the second object, the present invention provides a failure recovery method comprising the following steps: (a) managing a label table which associates incoming labels related to incoming transmission data with outgoing labels related to outgoing transmission data; (b) establishing a loop-shaped protection path that includes a part or whole of transmission links of an existing working path and would allow transmission data to flow in the opposite direction to that of the working path; and (c) executing a failure recovery process when a failure occurs on the working path, by changing the association between the incoming and outgoing labels stored in the label table, so as to switch the failed part of the working path to the loop-shaped protection path.

Moreover, to accomplish the first object, the present invention provides a transmission unit with failure recovery functions which restores communication over an optical network. This transmission unit comprises the following elements: a label table manager which manages a label table which associates incoming labels related to incoming optical transmission data with outgoing labels associated to outgoing optical transmission data, the incoming and outgoing labels being associated with optical wavelengths; a transmission controller which controls switching of the incoming optical transmission data, based on the label table; an optical path set-up unit which establishes a loop-shaped protection optical path that includes a part or whole of transmission links of an existing working optical path and would allow transmission data to flow in the opposite direction to that of the working optical path; and a failure recovery controller which executes a failure recovery process when a failure occurs on the working optical path, by changing the association between the incoming and outgoing labels stored in the label table, so as to switch the failed part of the working optical path to the loop-shaped protection optical path.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
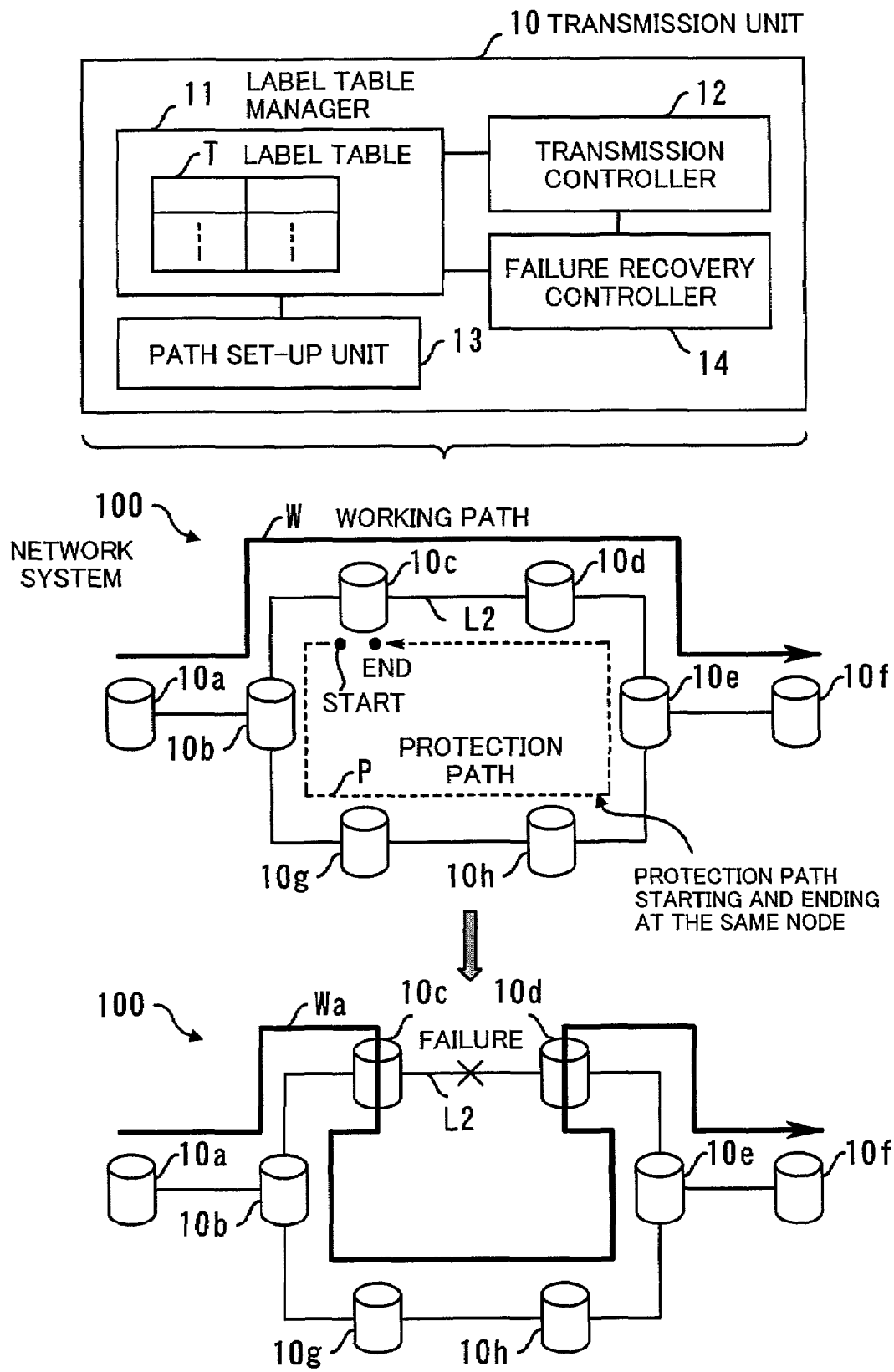
FIG. 1 is a conceptual view of a transmission unit according to a first embodiment of the present invention.

FIG. 1 is a conceptual view of a transmission unit according to a first embodiment of the present invention. The transmission unit 10 is a piece of signal transmission equipment for use in a label-switched network, with the capability of recovering from a link failure. The proposed transmission unit 10 can be applied to packet networks, connection-oriented optical networks such as SONET and SDH, and other communication environments. This description will first discuss MPLS packet routing systems with reference to FIGS. 1 to 20, and then an optical network application with reference to FIG. 21.

Referring first to the upper half of FIG. 1, the transmission unit 10 comprises the following elements: a label table manager 11, a transmission controller 12, a path set-up unit 13, and a failure recovery controller 14. The transmission unit 10 delivers individual short information messages called packets, using label-switching techniques. Each labeled packet is forwarded from one transmission unit to the next transmission unit, based on its label information.

The label table manager 11 manages a label table T which associates the labels of incoming packets with those of outgoing packets. To define such labels, it employs a method called the constraint-based routing using label distribution protocol (CR-LDP) as will be described later in FIG. 3. The transmission controller 12 performs transmission of packets with MPLS label switching techniques based on the label table T. The basics of MPLS packet transmission will be described in FIG. 2.

When a working path W is given, the path set-up unit 13 establishes a loop-shaped protection path P that includes a part or whole of transmission links of the working path W and would allow packets to flow in the opposite direction to that working path W. One method to produce such a loop-shaped protection path P is to choose one particular transmission unit on the working path and then draw a closed-loop path that starts from that unit and returns to the same unit.

Referring to the lower half of FIG. 1, an example network system 100 is shown. This network system 100 includes a plurality of transmission units 10a to 10h linked to each other, with electric cables or other transmission medium. A path between the two edge units 10a and 10f is established as shown in the middle part of FIG. 1, which delivers packets in a rightward direction. To back up this working path W, a protection path P is defined in the following way. The path starts from, for example, the transmission unit 10c and forms a loop in the counter-clockwise direction, so that packets would flow in the opposite direction to that of the current working path W. The resultant protection path P is indicated by the broken line in FIG. 1. As seen from the figure, the protection path P starts and ends at the same transmission unit 10c, and the working path W and protection path P share a part of their transmission links.

Then the transmission unit 10c connects the start of the protection path P and the end of the protection path P, and makes the protection path P loop-shaped.

While the above method is a simple way to produce a loop-shaped protection path P, it is not intended to limit the invention to that specific method. As an alternative method, it would also be possible to create a closed loop by associating the labels of adjacent links with each other, without setting any particular start or end point.

Referring again to the topmost part of FIG. 1, the failure recovery controller 14 controls protection switching operation of the transmission unit 10 when a failure occurs. The controller 14 accomplishes this by changing the association between packet labels stored in the label table T, as well as switching the circuit from the working path W to the protection path P. For example, if the link L2 between the transmission units 10c and 10d was disrupted, the two transmission unit 10c and 10d would discard that portion of the working path W and enable the protection path P, thus establishing a new working path Wa to recover the system from the link failure. Details of this feature will be discussed later.

Figure 2:
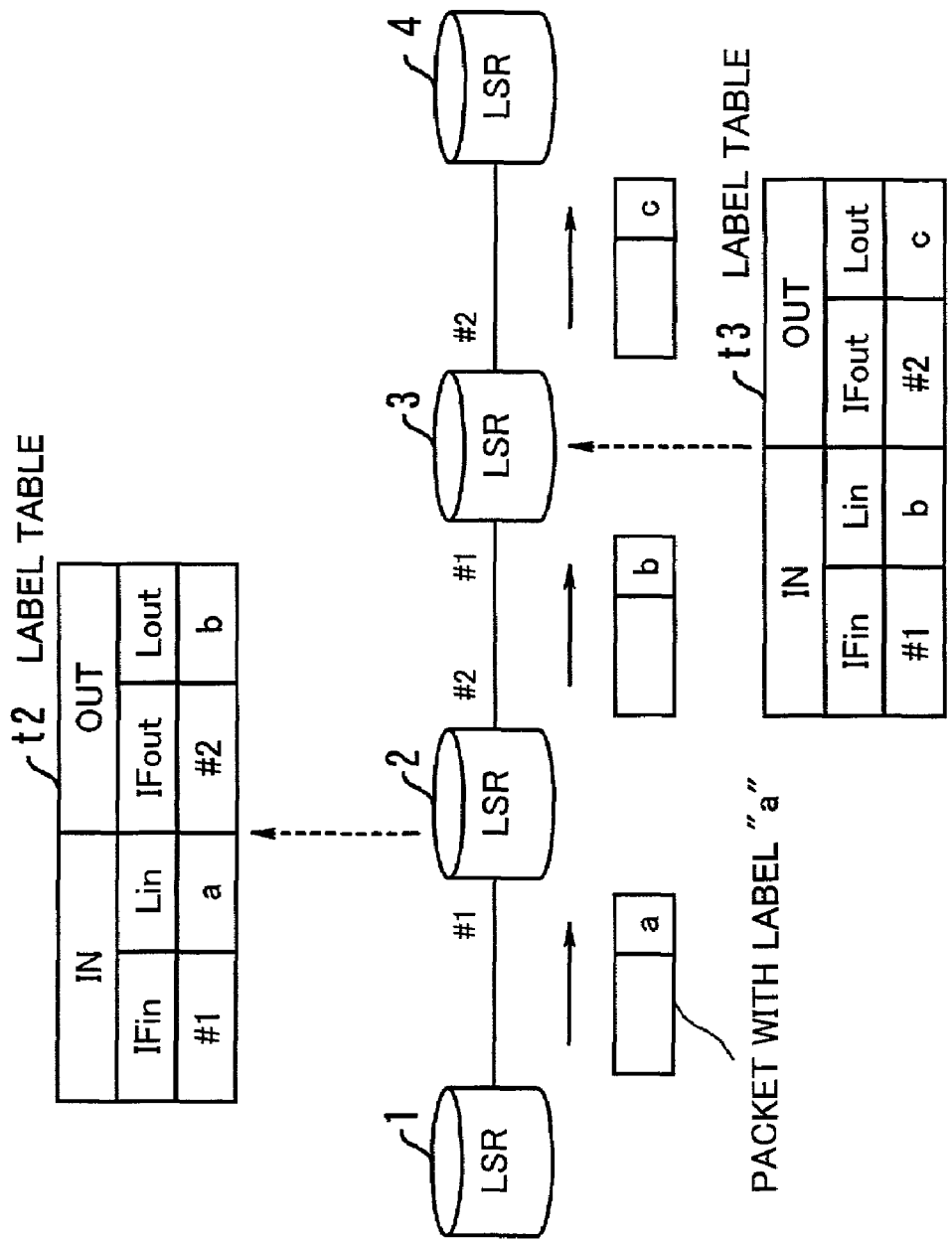
FIG. 2 explains MPLS packet transmission.

Referring next to FIG. 2, packet transmission based on the multiprotocol label switching (MPLS) techniques will be described. In the illustrated network, four LSRs 1 to 4 are connected in series over a transmission medium.

Every LSR 1 to 4 has a label table containing parameters used in label switching operation, each entry of which consists of an input parameter field IN and an output parameter field OUT. More specifically, each input parameter entry (IN) includes an input interface identifier IFin and its associated input label Lin. The IFin subfield of the label table actually shows the identifier of a link through which a packet is received, while the Lin subfield stores the value of a label related to incoming packets.

On the other hand, each output parameter entry (OUT) has an output interface identifier IFout and its associated output label Lout. The IFout subfield actually shows to which path an outgoing packet should go, and the Lout subfield stores the value of a label that will be attached to that outgoing packet. FIG. 2 shows two such label tables t2 and t3, which are stored in the second and third LSRs 2 and 3, respectively.

Suppose here that the first LSR 1 is attempting to send packets to the fourth LSR 4. When transmitting a packet, the first LSR 1 gives a label with the value of "a" to that packet. Upon receipt of the labeled packet at its port #1 (or input interface with identifier IFin=#1) the second LSR 2 searches its local label table t2, and when a relevant IN field entry is found, it then extracts OUT field values associated with that IN entry. The extracted OUT field shows IFout=#2 and Lout=b. Accordingly, the second LSR 2 retransmits the received packet through its output port #2 after changing the label value from "a" to "b."

The third LSR 3 now receives a packet labeled "b" through its port #1 (identifier IFin#1) It then retrieves a relevant output parameter entry OUT from its local label table t3. Changing the label value from "b" to "c," the third LSR 3 retransmits the packet through its port #2 (identifier IFout#2). Repeatedly label-switched in this way, the packet is delivered to the intended egress LSR 4.

As seen from the above explanation, each LSR routes MPLS packets to an appropriate output interface according to the parameters stored in their label tables, without using the destination address itself. The label is swapped at each relaying LSR when the packet is retransmitted.

Figure 3:
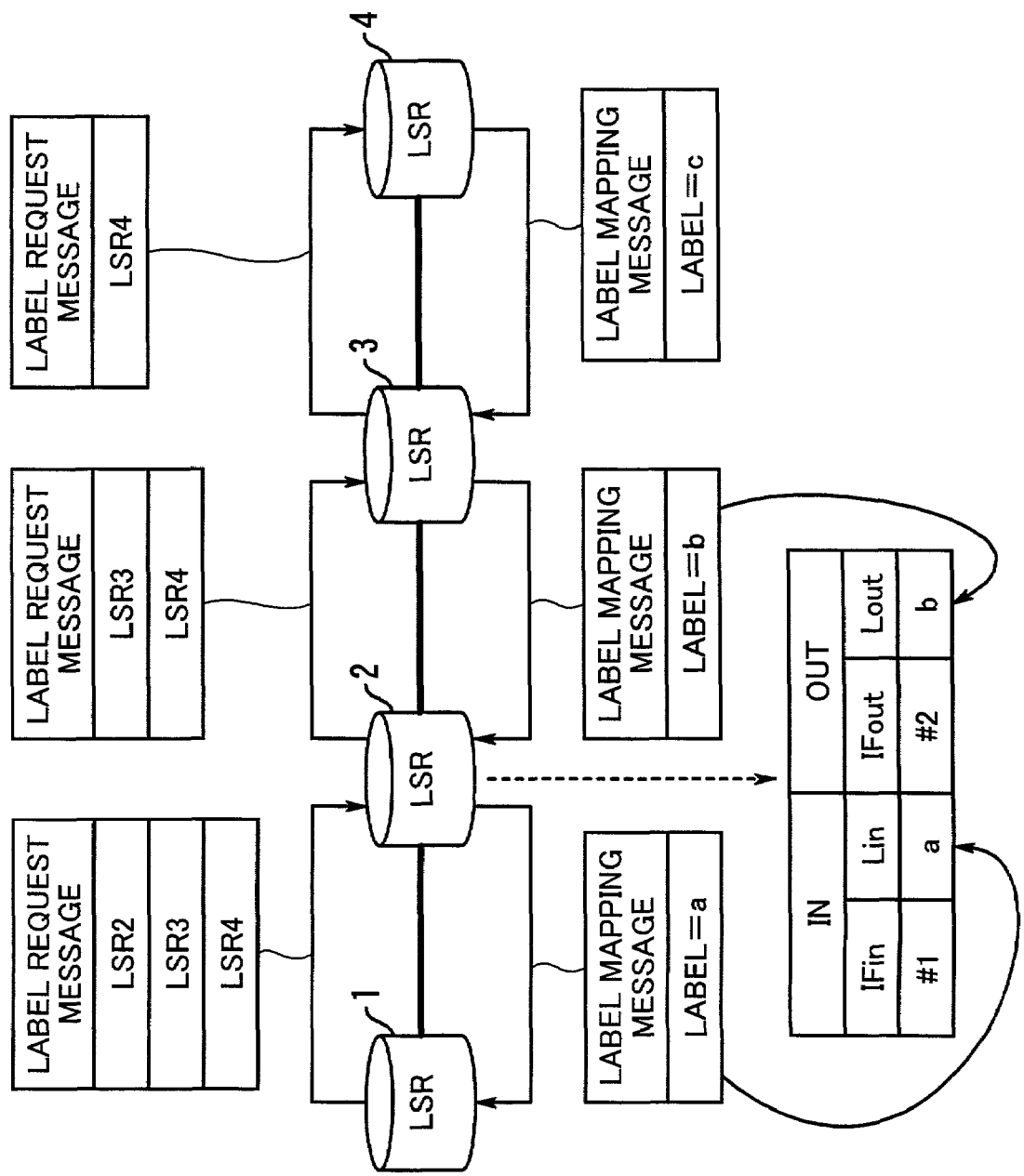
FIG. 3 explains constraint-based routing using label distribution protocol (CR-LDP)

Referring next to FIG. 3, the next section will explain how a label table is formulated with CR-LDP. Now think of the following label-switched path (LSP) in MPLS transmission.
    LSR 1→LSR 2→LSR 3→LSR 4

This LSP is established through a label distribution procedure as follows. First, the ingress LSR requests establishment of a new path by sending out a label request message toward the egress LSR using hop-by-hop routing. This label request message specifies a packet delivery route to the intended destination, including all intermediate LSRs along that route. In response to the label request message, the egress LSR sends a label mapping message back to the ingress LSR, which enables the intermediate LSRs to set up their label tables with a new entry for the requested LSP.

In the present example of FIG. 3, the ingress LSR 1 sends a label request message to the second LSR 2, specifying intermediate LSRs 2 and 3, as well as the egress LSR 4. The second LSR 2 then sends a label request message to the third LSR 3, specifying the remaining intermediate LSR 3 and the egress LSR 4. The third LSR 3 forwards a label request message to the egress LSR 4, specifying the egress LSR 4 itself.

In response to the above label request message, the egress LSR 4 sends back a label mapping message to notify the third LSR 3 of a label value of "c," which permits the LSR 3 to set up its local label table to include an outgoing label "c" for the relevant output interface. The third LSR 3 then assigns an incoming label "b" to that table entry and sends a label mapping message back to the second LSR 2, including that label value of "b." This permits the LSR 2 to set up its own label table to include an outgoing label "b." Likewise, the second LSR 2 sends back a label mapping message to notify the ingress LSR 1 of a label value of "a" for use in sending a packet over the established path. In this way, the label table in each LSR is updated with the information about a new path.

Referring now to FIGS. 4 to 7, the following section will focus on a failure recovery process of the transmission unit 10 according to the first embodiment of the invention. FIGS. 4 to 7 depict this process as follows: steps S1 to S3 in FIG. 4, steps S4 to S6 in FIG. 5, steps S7 to S9 in FIG. 6, and step S10 in FIG. 7.

The illustrated network system 100 includes eight LSRs 1 to 8, each containing the foregoing functions of the proposed transmission unit 10. Six LSRs 2, 3, 4, 5, 7, and 8 are connected in a ring topology, and two LSRs 1 and 6 are linked to the LSRs 2 and 5, respectively. Currently, there is a working path W from the ingress LSR 1 to the egress LSR 6 as indicated by the bold solid arrow in FIG. 4. When a packet travels over the working path W, it is assigned the following label values in each link transport and swapped at each intermediate LSR:
    Label "A" (LSR 1→LSR 2)
    Label "B" (LSR 2→LSR 3)
    Label "C" (LSR 3→LSR 4)
    Label "D" (LSR 4→LSR 5)
    Label "E" (LSR 5→LSR 6)

Further, every LSR in the network system 100 has local identifiers assigned to their input and output interfaces, which are indicated with the number sign (#) in FIGS. 4 to 7.

Briefly, the following explanation assumes such a scenario that the current working path W is disrupted at some time point due to a failure with the link L2 between the LSRs 3 and 4, and the system 100 performs protection switching to recover from the link failure.

(S1) The working path W has been set up as follows:
    LSR 1→LSR 2→LSR 3→LSR 4→LSR 5→LSR 6
(S2) In the LSR 3, its label table manager 11 has a label table T3w for the working path W. This label table T3w consists of a working-path input parameter field INw and a working-path output parameter field OUTw. The working-path input parameter field INw has an input interface identifier subfield IFin and an incoming label subfield Lin. Currently, the label table T3w has an entry of (IFin=#1, Lin=B). The working-path output parameter field OUTw, on the other hand, has an output interface identifier subfield IFout and an outgoing label subfield Lout. The label table T3W has an entry of (IFout=#2, Lout=C) in the OUTW field.
(S3) In the next LSR 4, its label table manager 11 has a label table T4w for working paths, as in the preceding LSR 3. Currently, the label table T4W contains an entry (IFin=#1, Lin=C) in its working-path input parameter field INw, together with it associated entry (IFout=#2, Lout=D) in its working-path output parameter field OUTw.
(S4) Referring to FIG. 5, a loop-shaped protection path P is set up in such a way that it would include a part or whole of transmission links of the current working path W and make packets flow in the opposite direction to that of the working path W. This setup can be done with CR-LDP, or by configuring each relevant LSR individually.

For the above protection path P, the following label values are assigned to each link transport:
    Label "a" (LSR 3→LSR 2)
    Label "b" (LSR 2→LSR 7)
    Label "c" (LSR 7→LSR 8)
    Label "d" (LSR 8→LSR 5)
    Label "e" (LSR 5→LSR 4)
    Label "f" (LSR 4→LSR 3)

Further, it is assumed that the path set-up unit 13 in the third LSR 3 is chosen as the unit that initiates the task of creating a closed-loop path that starts from and returns to that unit.

(S5) The LSR 3 activates its label table manager 11 to create a label table T3p for protection paths. Actually, this table has to contain parameters that combine the start point and the end point of the protection path P. More specifically, the label table T3p consists of a protection-path input parameter field INp and a protection-path output parameter field OUTp. The protection-path input parameter field INp has an input interface identifier subfield IFin and an incoming label subfield Lin. Currently, the label table T3p has an entry of (IFin=#2, Lin=f). The protection-path output parameter field OUTp, on the other hand, has an output interface identifier subfield IFout and an outgoing label subfield Lout. Currently, the label table T3p has an entry of (IFout=#1, Lout=a) in the OUTp field.

With the above label table T3p created for protection path, the LSR 3 is expected to operate as follows in the event of failure. When an incoming packet arrived at its port #2 (i.e., the end point set in the IFin subfield), and if the label of that packet had a value "f" stored in the Lin subfield, the LSR 3 would not receive the packet, but forward the packet to the port #1 (i.e., the start point set in the IFout subfield), changing its label from "f"0 to "a" as specified in the Lout subfield. In this way, the LSR 3 would forward the packet to the loop-shaped protection path P.

(S6) In the fourth LSR 4, its label table manager 11 creates a label table T4p for protection paths. This table T4p consists of a protection-path input parameter field INp and a protection-path output parameter field OUTp. The former field INp has an input interface identifier subfield IFin and an incoming label subfield Lin, while the latter field OUTP has an output interface identifier subfield IFout and an outgoing label subfield Lout, just as in the label table T3p in the LSR 3.

For the protection path P, the label table T4p contains an entry (IFin=#2, Lin=e) in its protection-path input parameter field INp, together with an associated entry (IFout=#1, Lout=f) in its protection-path output parameter field OUTp.

Figure 6:
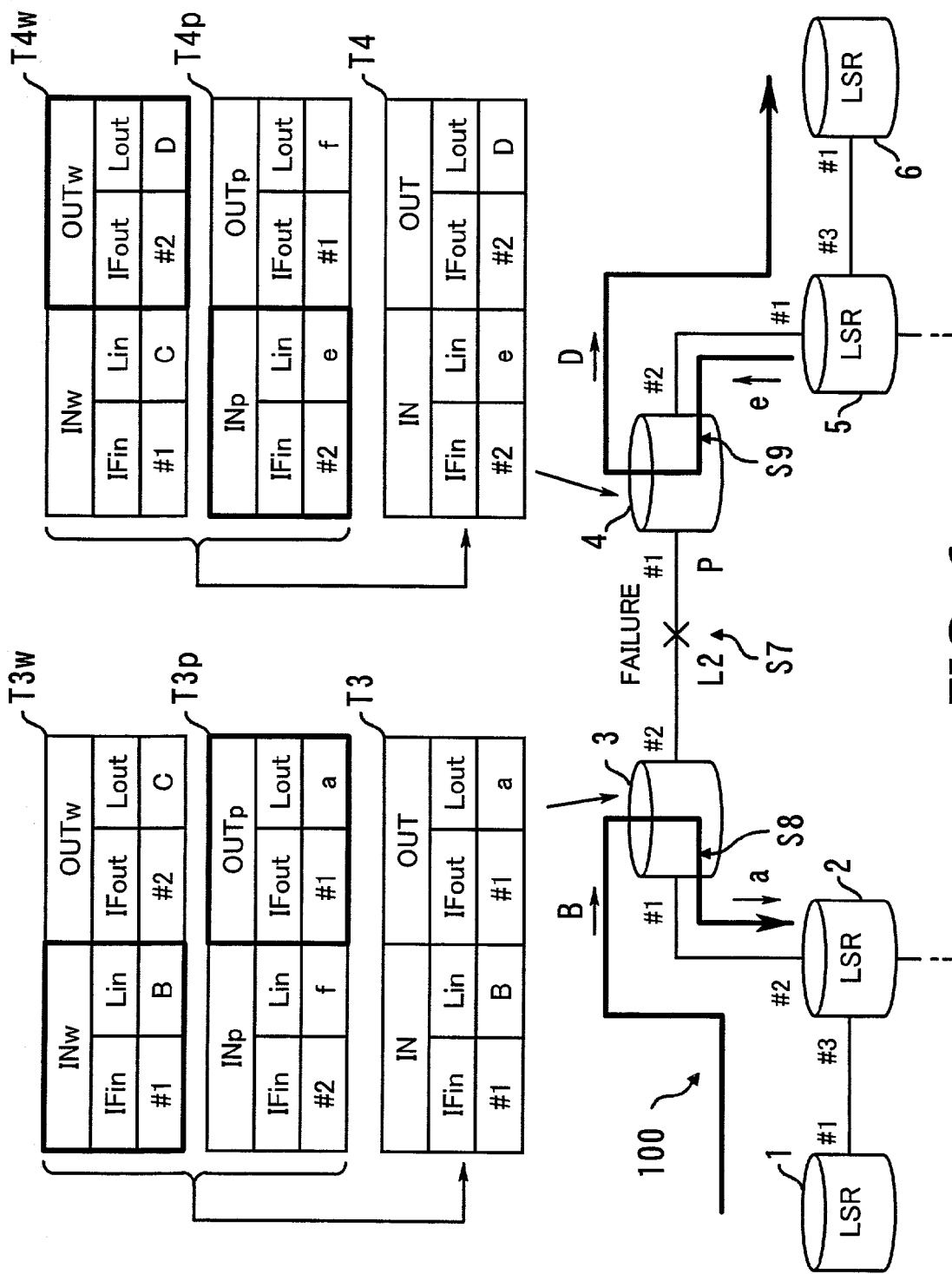
Figure 7:
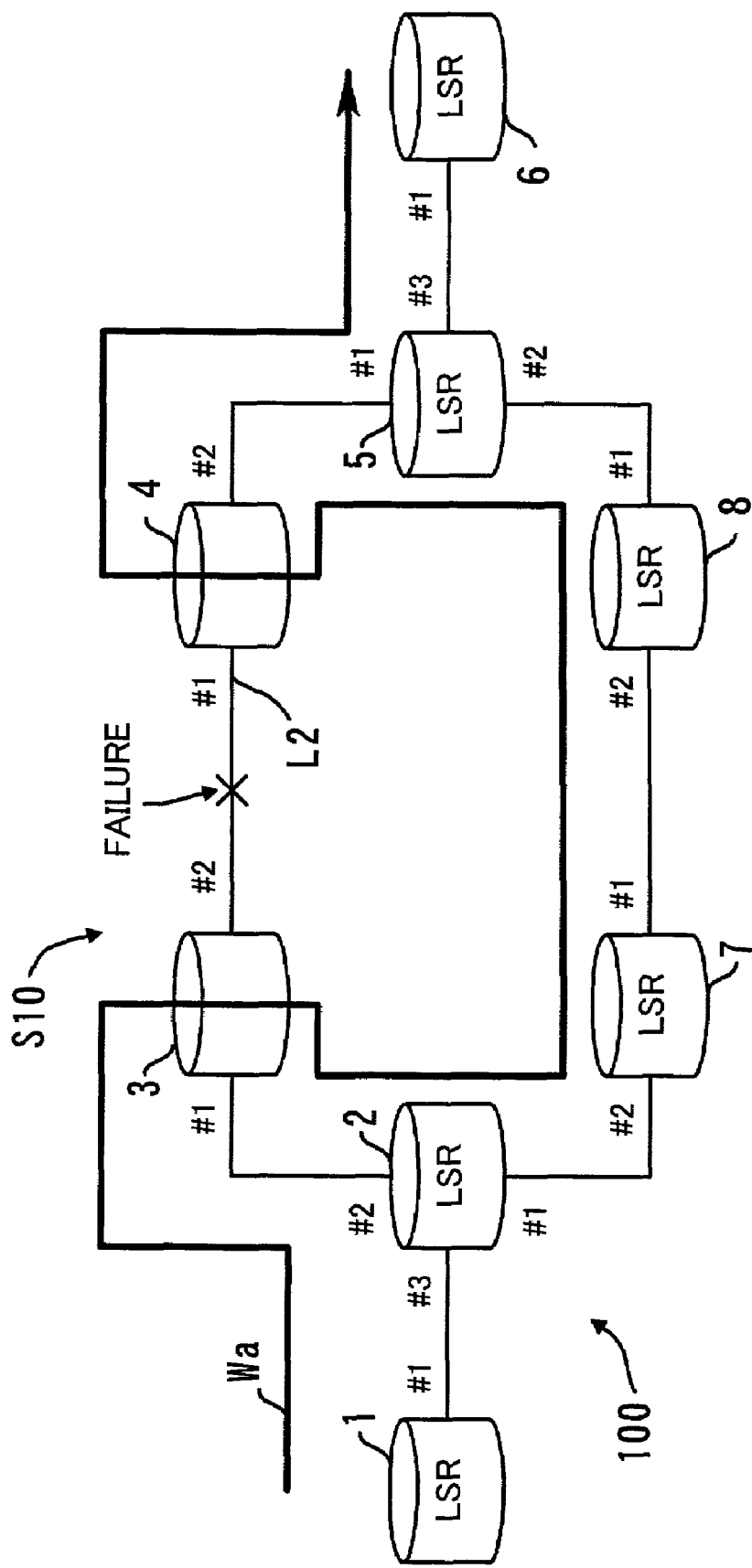

(S7) Referring to FIG. 6, a failure occurs somewhere on the link L2 interconnecting the LSRs 3 and 4, which is detected at both ends of that link. Technically, such link failures can be detected by, for example, periodically sending an "are you alive" message to each other. One detects a failure if there is no such message received from the other within a prescribed period.

(S8) The third LSR 3 is located at the upstream end of the failed link L2. Accordingly, its failure recovery controller 14 associates the working-path input parameter field INw with the protection-path output parameter field OUTp, thus enabling the label table manager 11 to create a new label table T3 for detour paths.

While packets arrive at the port #1 from the previous working path W, the detour-path label table T3 causes the LSR 3 to handle them differently from before. That is, instead of forwarding them to its port #2, the LSR 3 sends such incoming packets back to the LSR 2 through the port #1, replacing their present label with the predefined outgoing label "a" for the protection path P. In this sense, the LSR 3 has become a loopback point on the protection path P.

(S9) The fourth LSR 4 is located at the downstream end of the failed link L2. Accordingly, within the LSR 4, the failure recovery controller 14 associates the protection-path input parameter field INp with the working-path output parameter field OUTw, thus enabling the label table manager 11 to create a new label table T4 for detour paths.

While packets directed to the protection path P by the LSR 3 arrive at the LSR 4's port #2, the LSR 4 will not output them to its opposite port #1. The new label table T4 causes the LSR 4 to route such packets toward the egress LSR 6 through the same port #2, replacing their labels with the outgoing label "D" that has been used for the working path W. In this sense, the LSR 4 has become another loopback point on the protection path P.

(S10) Through the above two steps S8 and S9, the working path W is now connected to the protection path P at the first loopback point LSR 3, and the other end of the protection path P is connected to the working path W at the second loopback point LSR 4. This results in a new path Wa as indicated by the bold solid arrow in FIG. 7, which successfully detours packets around the failed link L2.

Figure 8:
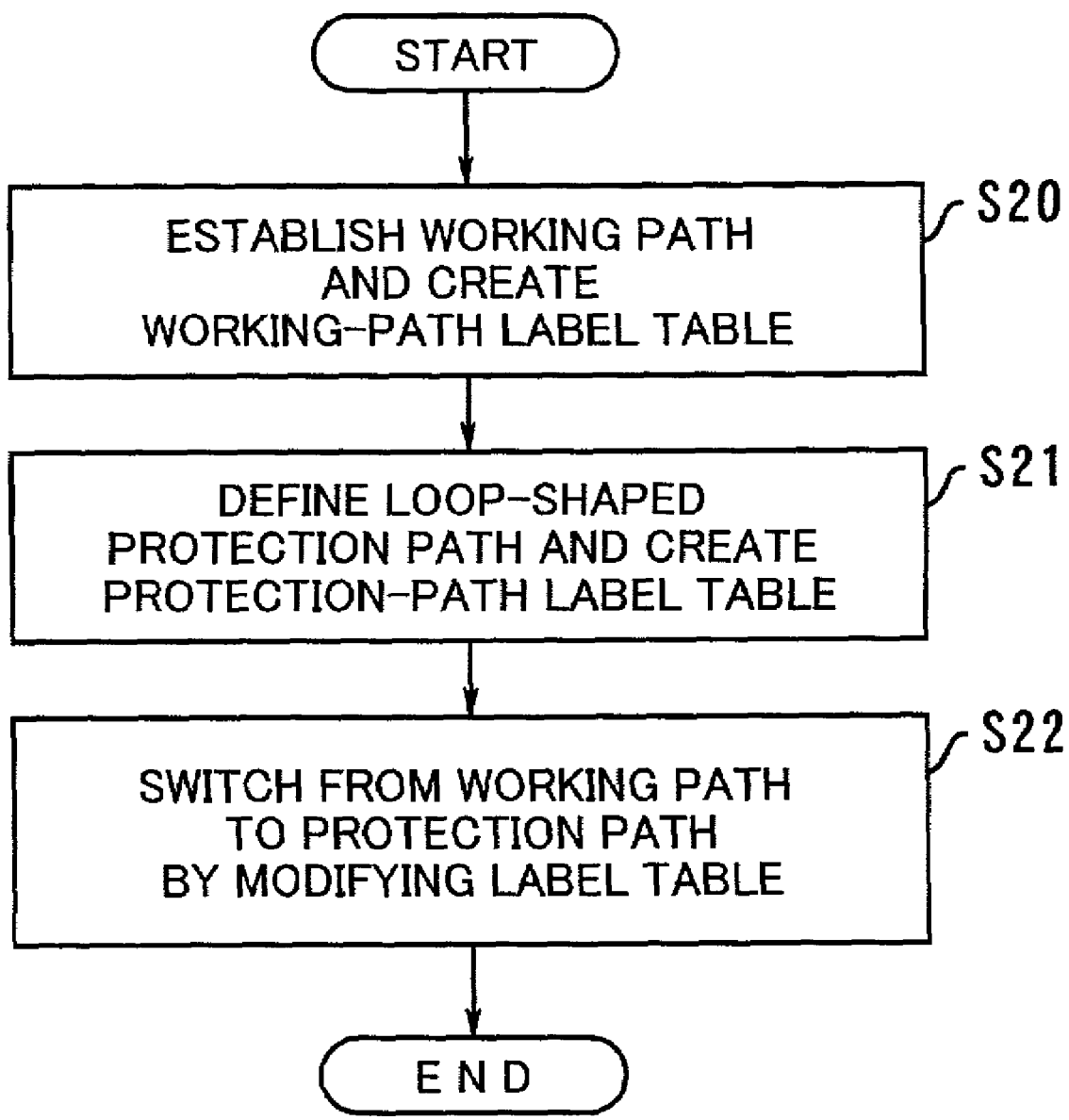
FIG. 8 is a flowchart of a failure recovery method according to the present invention.

FIG. 8 is a flowchart of the failure recovery method according to the present invention. The method comprises the following steps:

(S20) A working-path label table is created, which associates the label values of incoming packets with those of outgoing packets.

(S21) A loop-shaped protection path is established in such a way that it will include a part or whole of transmission links of the working path and allow packets to flow in the opposite direction to that of the working path. Each transmission unit creates a protection-path label table describing such a protection path.

(S22) When a failure occurs, a failure recovery process is executed. Specifically, the failed part of the working path is switched to the protection path by modifying the association between labels in the working-path label table, with reference to the protection-path label table.

As seen from the above sections, the proposed transmission unit 10 and failure recovery method define a loop-shaped protection path P previously, and modify the association between labels when a failure occurs. The protection path P replaces the failed link of the working path W, thus permitting the system to recover from disruption. It should be noted that the proposed loop-shaped protection path P is not dedicated to any particular link, but covers all the links that are shared with the working path W. This feature of the present invention is a distinct advantage over the conventional method, which has to reserve as many protection paths as the number of links that could fail. The present invention enables more efficient use of limited network resources and thus improves the operability and usability of network services.

The failure recovery technique of the present invention is also distinguishable from conventional protection mechanisms used in SONET/SDH ring networks. In typical SONET/SDH networks, nodes are connected in a dual ring topology, where all signals are transported in opposite directions over the time-division multiplexed transmission lines. One ring is actually used for working channels, while the other is reserved as protection channels. Besides monitoring data traffic over the working ring, each node extracts data from or adds data to the assigned time slots of the ring. In the event of a failure, the failed part of the working ring is bypassed through the protection ring in order to recover from the fault. This process is known as the ring protection.

As described above, SONET/SDH networks are designed to provide fault tolerance. Unfortunately, however, their ring protection mechanisms are not applicable to label-switching networks such as MPLS for the following reason. As opposed to SONET/SDH's physical ring transport, MPLS paths are established logically by defining labels from an ingress node to a particular egress node where packets are terminated. Because of such topological and functional differences from SONET/SDH ring networks, MPLS networks cannot apply the existing ring protection techniques designed for circular data paths. The present invention, on the other hand, is intended to provide a failure recovery method, as well as a transmission unit with failure recovery functions, which will work responsively and efficiently in MPLS and other label switching networks.

Figure 4:
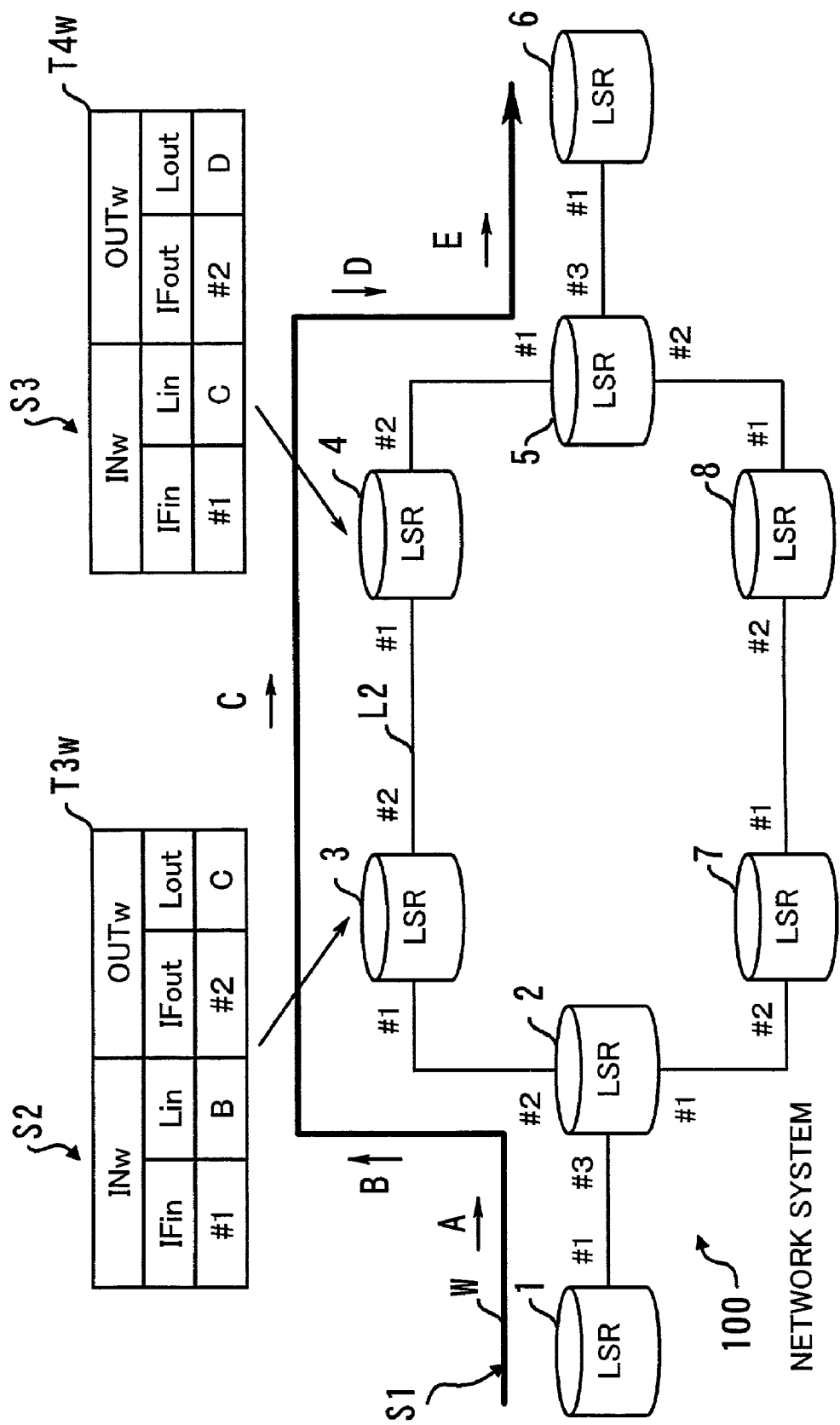
FIGS. 4 to 7 show a specific example of a failure recovery process according to the present invention.
Figure 5:
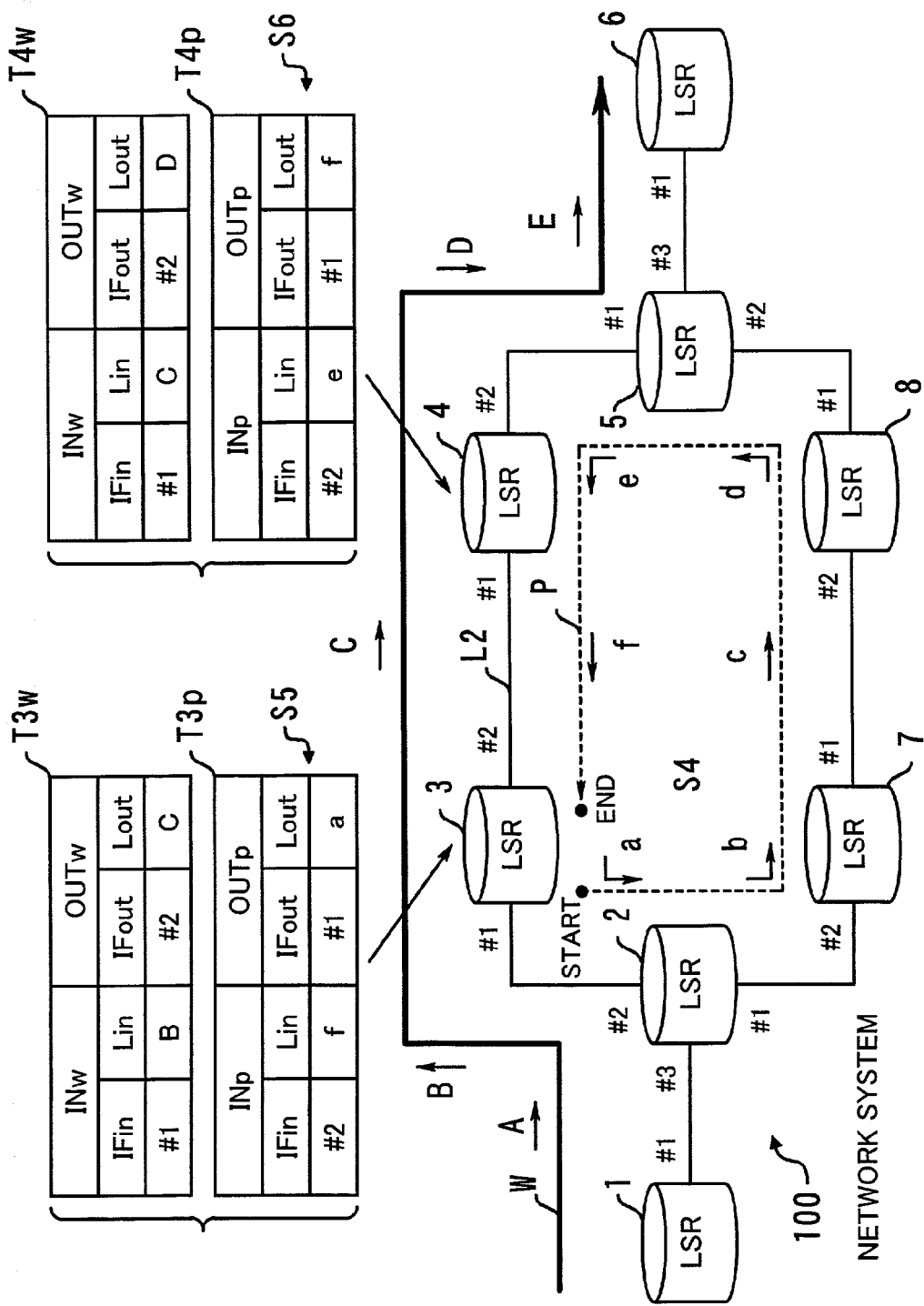
Figure 9:
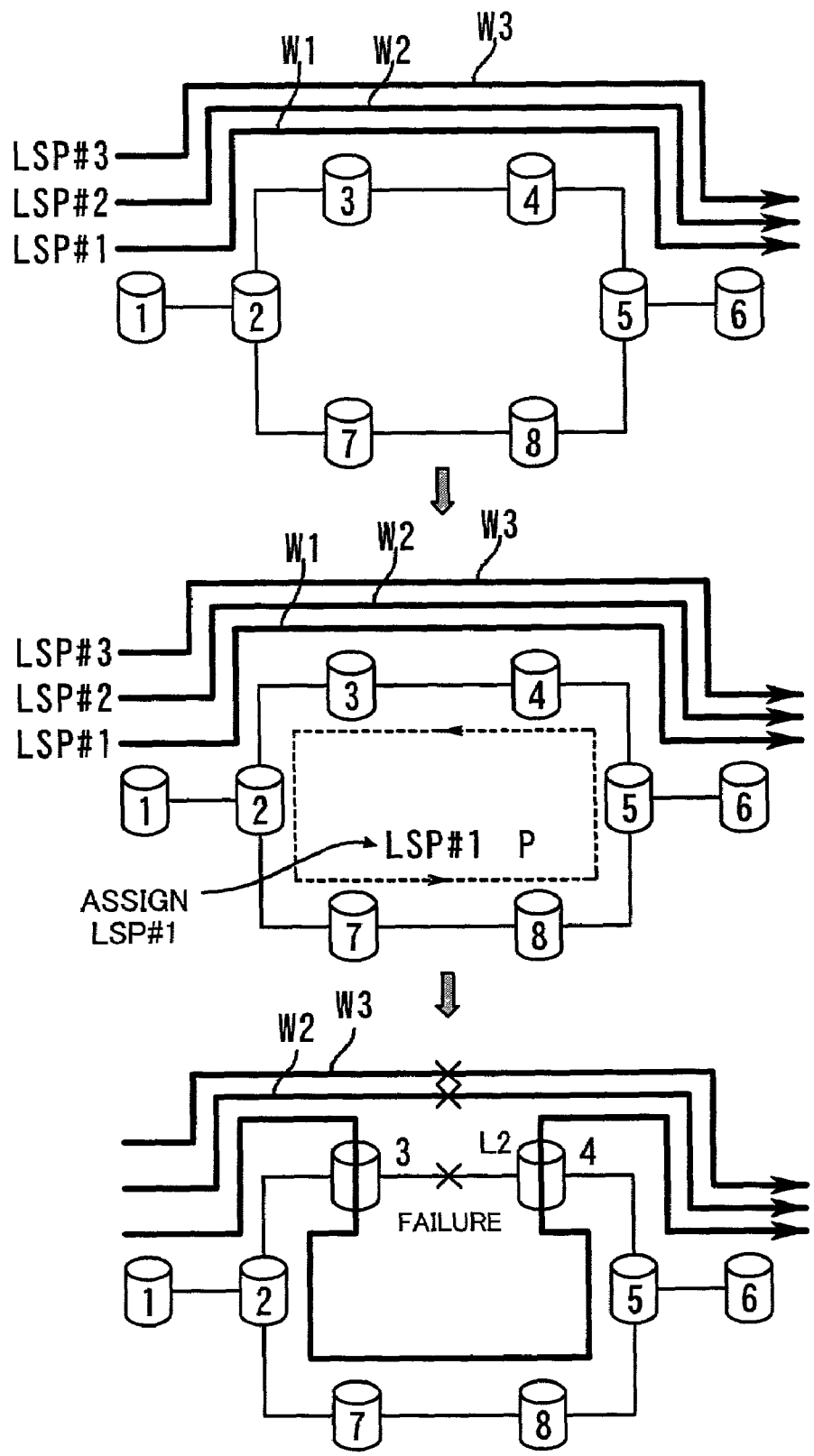
FIG. 9 shows a second embodiment of the present invention.

Referring next to FIG. 9, a second embodiment of the present invention will be explained. The second embodiment assumes a plurality of working paths. As in the previous example of FIG. 4, FIG. 9 shows a network system with eight LSRs 1 to 8. There are three working paths W1 to W3 from the ingress LSR 1 to the egress LSR 6 along the route of:

LSR 1→LSR 2→LSR 3→LSR 4→LSR 5→LSR 6

Here, the three working paths W1 to W3 distinguish themselves from each other by their unique identifiers LSP#1 to LSP#3, which are determined at the time of path establishment.

When defining a loop-shaped protection path P, the system assigns one of the above working path identifiers LSP#1 to LSP#3 to that protection path P. More specifically, a CR-LDP message is used to carry a particular working path identifier in a certain field. The CR-LDP message is received and processed by the intermediate LSRs 2 to 5 on the working paths W1 to W3. These intermediate LSRs 2 to 5 associate the protection path P of interest with the identifier of either of the working paths W1 to W3. The label table manager 11 in each LSR is responsible for management of such information.

In the event that a link failure is encountered, the failure recovery controller 14 uses the protection path P to create an alternative route that detours around the failed link. Note that the failure recovery controller 14 recovers only one working path specified by the identifier that has previously been associated with the protection path P.

Referring to the example of FIG. 9, the identifier LSP#1 of the first working path Wi is associated with the protection path P. When the link L2 fails, the system will save the first working path WI selectively, using the protection path P, as shown in the bottommost part of FIG. 9.

Figure 10:
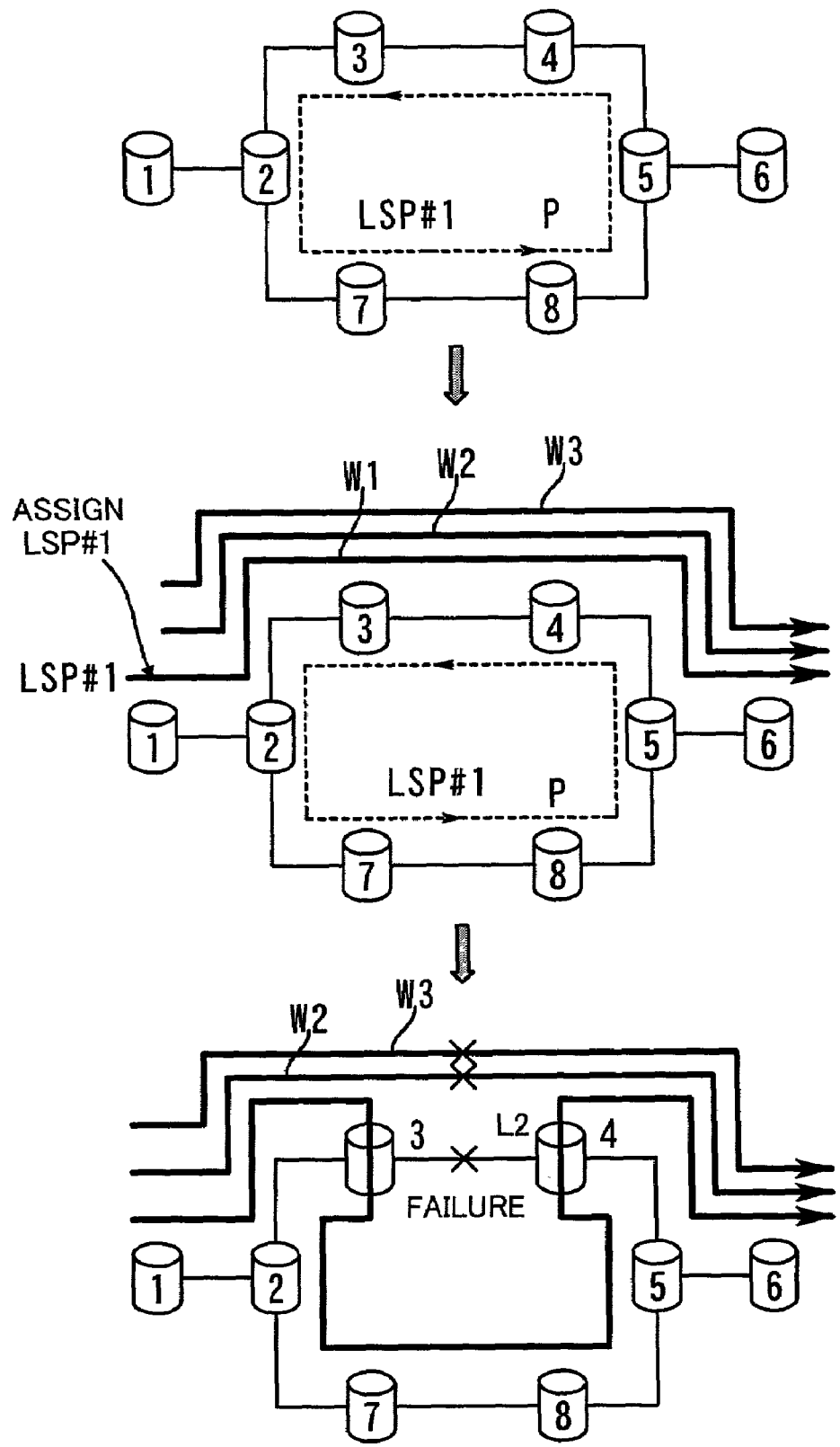
FIG. 10 shows a variation of the second embodiment of the present invention.

FIG. 10 shows a variation of the second embodiment of the present invention. Contrary to the method explained in FIG. 9, the identifier of the protection path P is associated with one of the working paths. More specifically, in this modified version of the second embodiment, the system defines a protection path P before establishing working paths W1 to W3. The protection path P is given a unique identifier, LSP#1 in the example of FIG. 10. Later, this protection path identifier LSP#1 is associated with one working path to be established.

In an implementation, a CR-LDP message is used to carry a particular protection path identifier in a certain field. Such a CR-LDP message is received and processed by the intermediate LSRs 2 to 5 on the working paths W1 to W3. They associate the specified protection path identifier with either of the three working paths W1 to W3. The label table manager 11 in each LSR is responsible for management of such information.

In the event of a link failure, the failure recovery controller 14 uses the protection path P to create an alternative route that detours around the failed link. Note that it restores only one working path that has previously been associated with the protection path identifier.

Referring to the example of FIG. 10, the identifier LSP#1 of the protection path P is associated with the first working path W1. When the link L2 fails, the system will save the first working path W1 selectively, using the protection path P, as shown in the bottommost part of FIG. 10.

Figure 11:
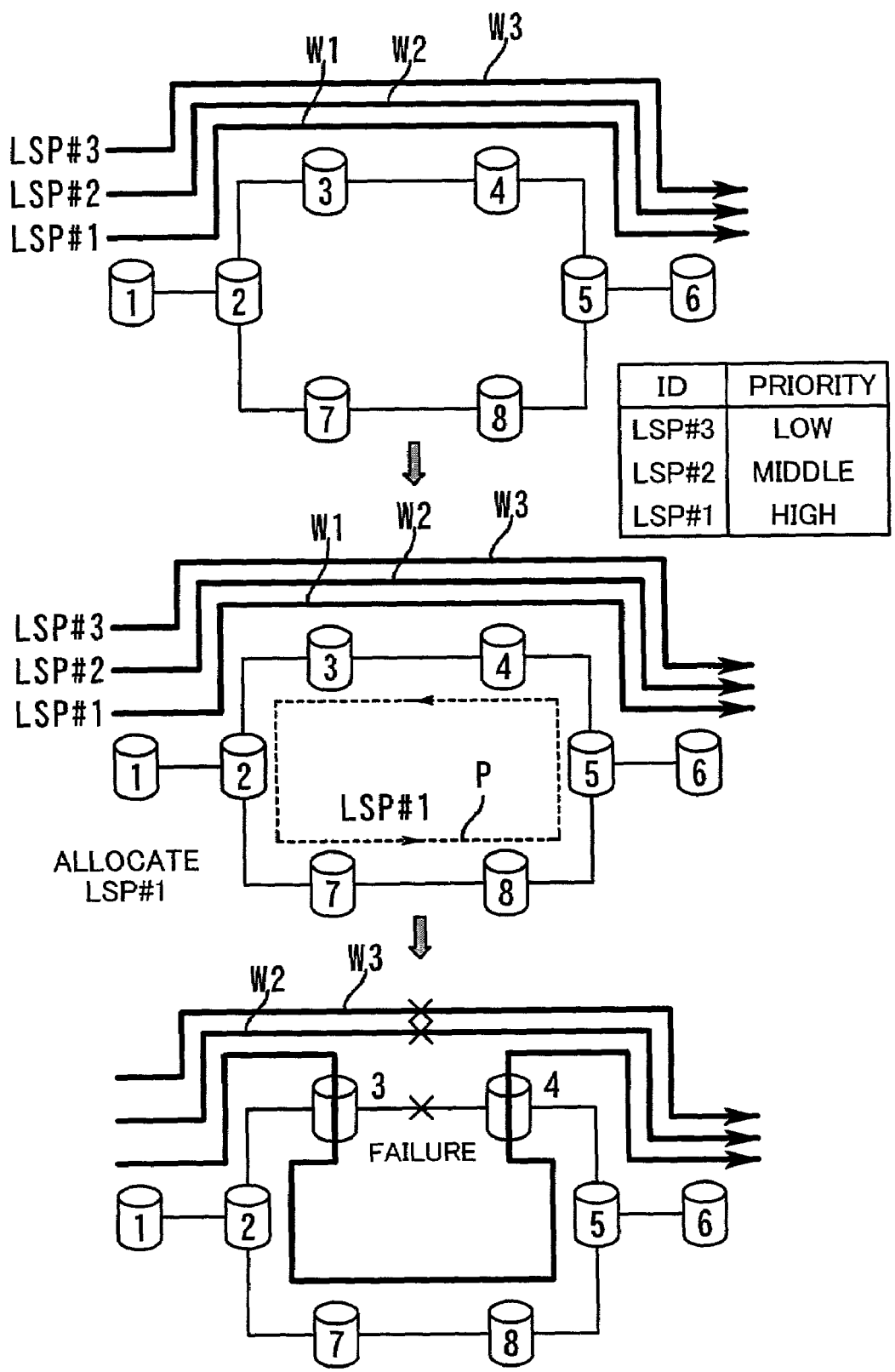
FIG. 11 shows a third embodiment of the present invention.

Referring next to FIG. 11, a third embodiment of the present invention will be explained. The third embodiment differs from the preceding ones in that it previously prioritizes working paths. When a failure occurs, the failure recovery controller selects one of the working paths on the basis of their priority levels. FIG. 11 shows a network system including eight LSRs 1 to 8, where three working paths W1 to W3 are established from the ingress LSR 1 to the egress LSR 6 along the route of:

LSR 1→LSR 2→LSR 3→LSR 4→LSR 5→LSR 6

The working paths W1 to W3 have different priority levels. In the example of FIG. 11, the first working path W1 has the highest priority, which is followed by the second working path W2 and then by the third working path W3. The label table manager 11 in each LSR is responsible for management of such priority information.

When defining a loop-shaped protection path P, the system associates one of the above working path identifiers LSP#1 to LSP#3 with that protection path P, considering which path has the highest priority. When a link failure is encountered, the failure recovery controller 14 uses the protection path P to repair the associated working path. As shown in the bottommost part of FIG. 11, a failure of the link L2 would cause the system to save the first working path W1 selectively.

Figure 12:
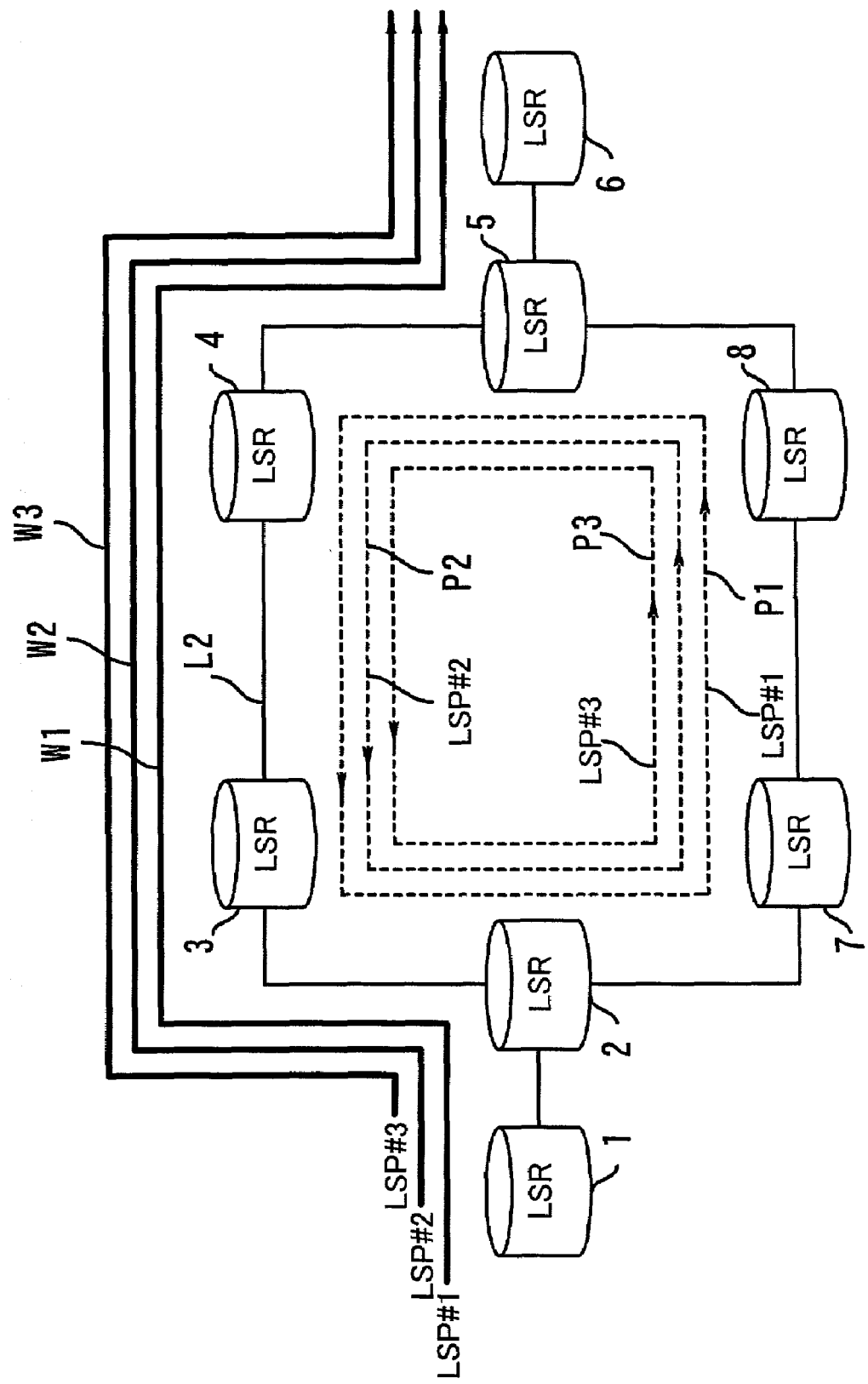
FIGS. 12 and 13 show another variation of the second embodiment.
Figure 13:
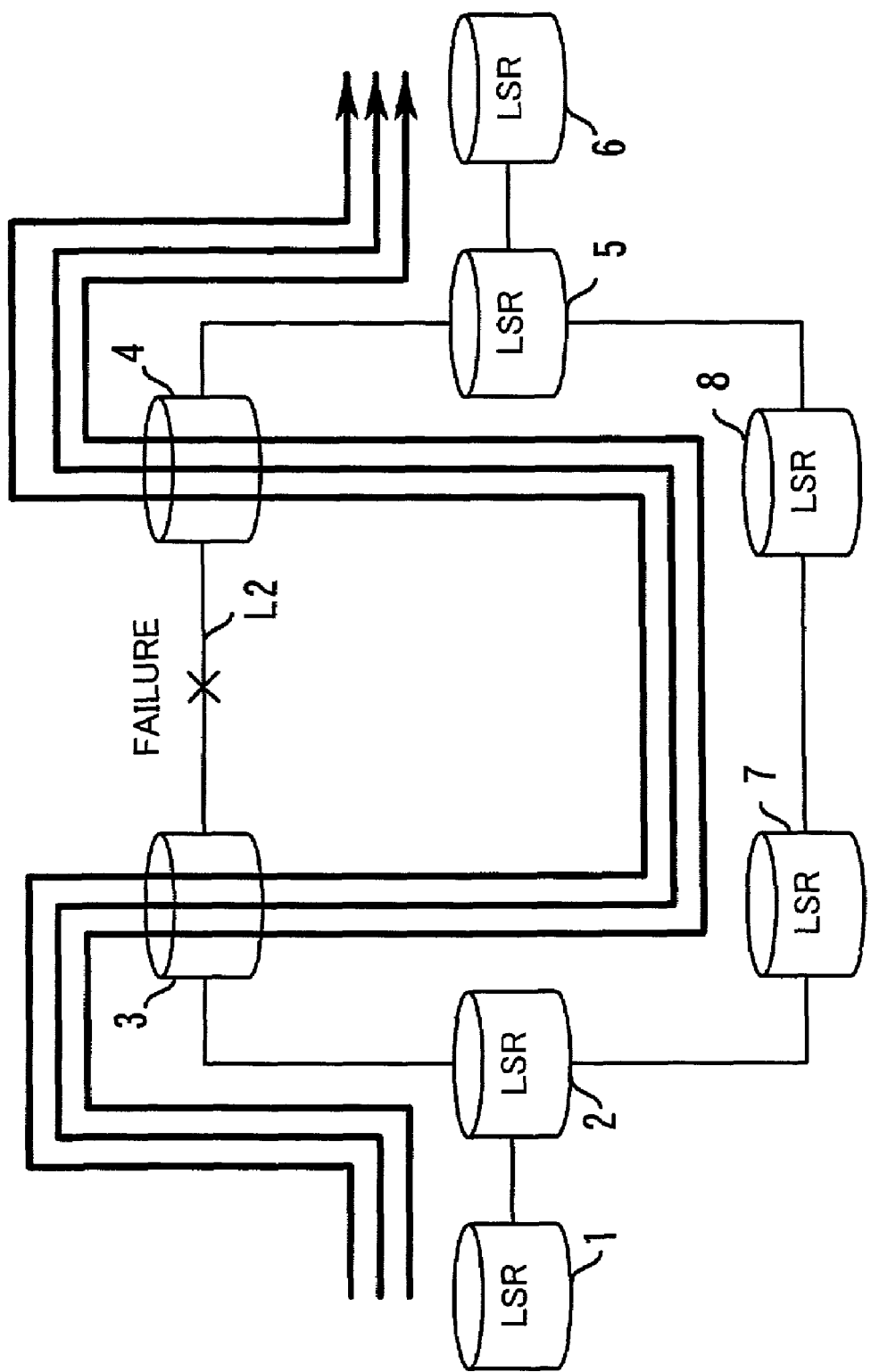

While the foregoing second and third embodiments assume one protection path for two or more working paths, it would also be possible to repair a plurality of working paths with a plurality of protection paths. FIGS. 12 and 13 show such a variation of the second embodiment of the present invention. The illustrated network system includes eight LSRs 1 to 8, where three working paths Wi to W3 with identifiers LSP#1 to LSP#3 are established from the ingress LSR 1 to the egress LSR 6 along the route of:

LSR 1→LSR 2→LSR 3→LSR 4→LSR 5→LSR 6

In addition, three loop-shaped protection paths P1 to P3 are established along the route of:

LSR 3→LSR 2→LSR 7→LSR 8→LSR 5→LSR 4→LSR 3

These protection paths P1 to P3 are assigned identifiers LSP#1 to LSP#3, respectively.

When a failure occurs in the link L2, the disrupted working paths W1 to W3 are repaired with the protection paths P1 to P3 as indicated by the bold solid arrows in FIG. 13.

While the network system of FIGS. 12 and 13 offers as many protection paths as the number of working paths, it is also possible to reduce the number of protection paths if necessary. In this case, the working paths may be prioritized as in the way explained in the third embodiment of FIG. 11.

Referring next to FIGS. 14 to 17, a fourth embodiment of the present invention will be described. The foregoing three embodiments reconfigure the network to loop back incoming packets at particular LSRs located near the failed link. Those loopback point LSRs, however, would have to perform unnecessary packet routing, consuming extra link resources. To address this issue, the fourth embodiment incorporates a mechanism to eliminate loopback points, if any, when switching a working path W to a protection path P.

Figure 14:
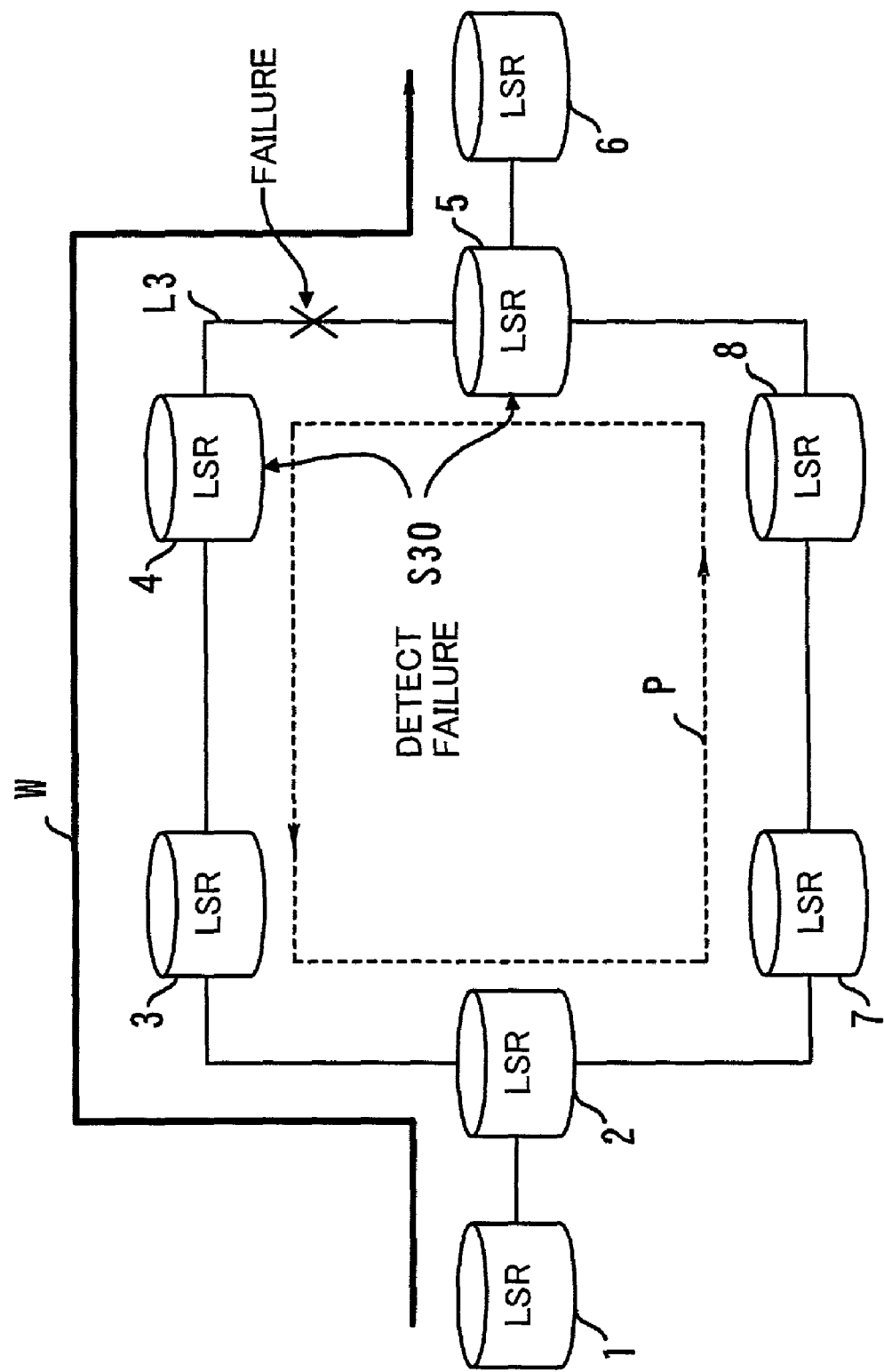
FIGS. 14 to 17 show a fourth embodiment of the present invention.
Figure 15:
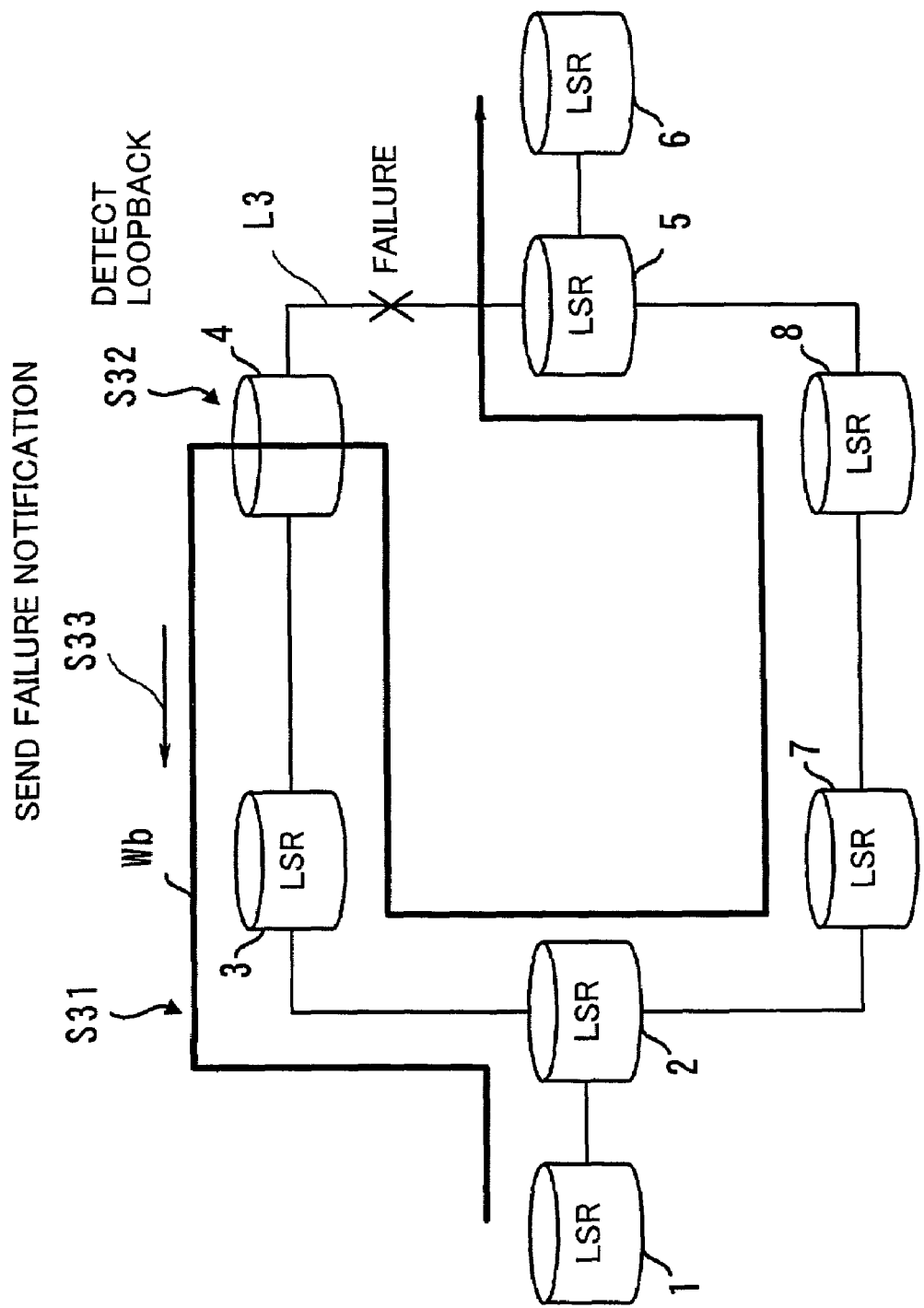
Figure 16:
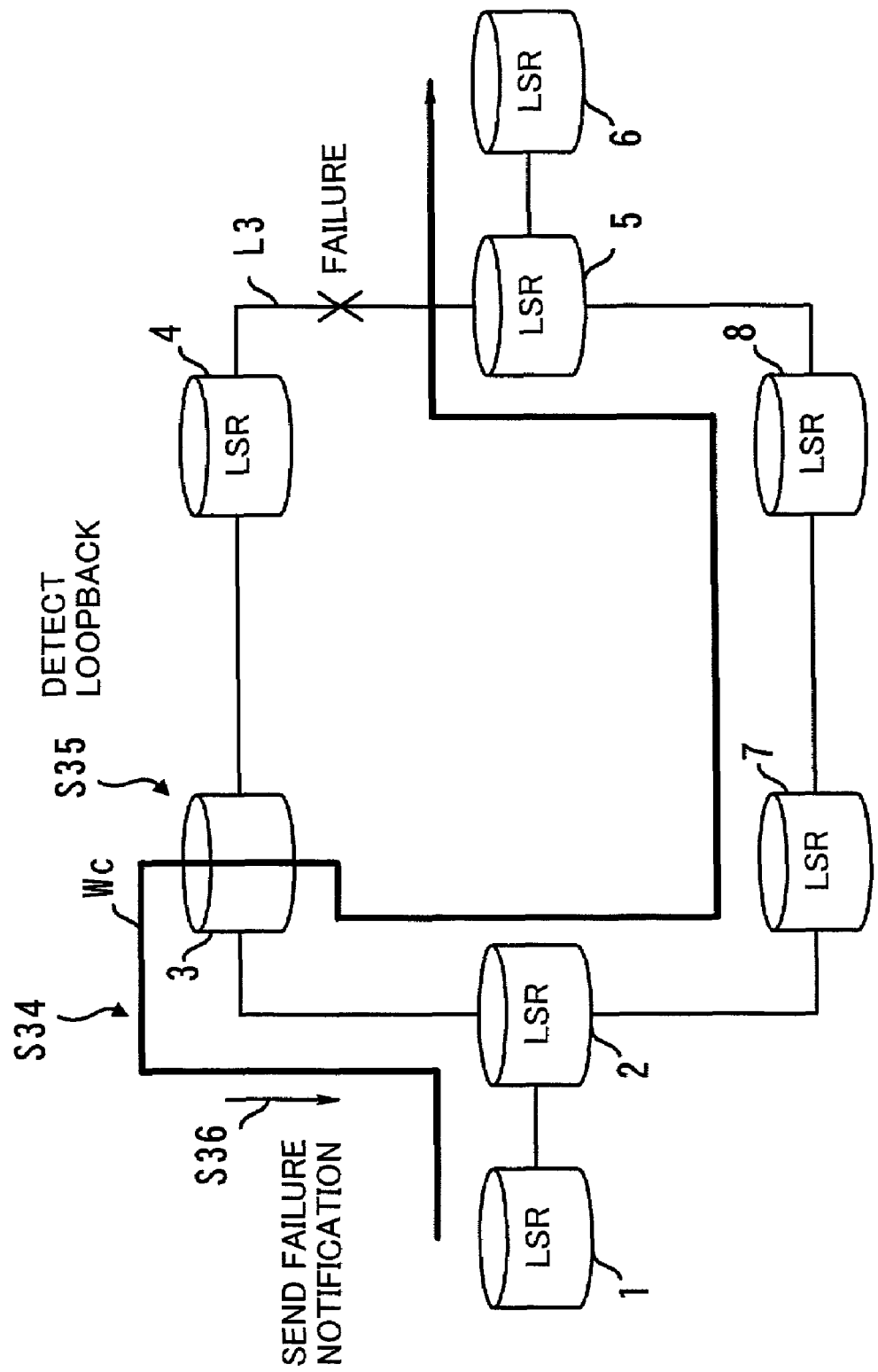
Figure 17:
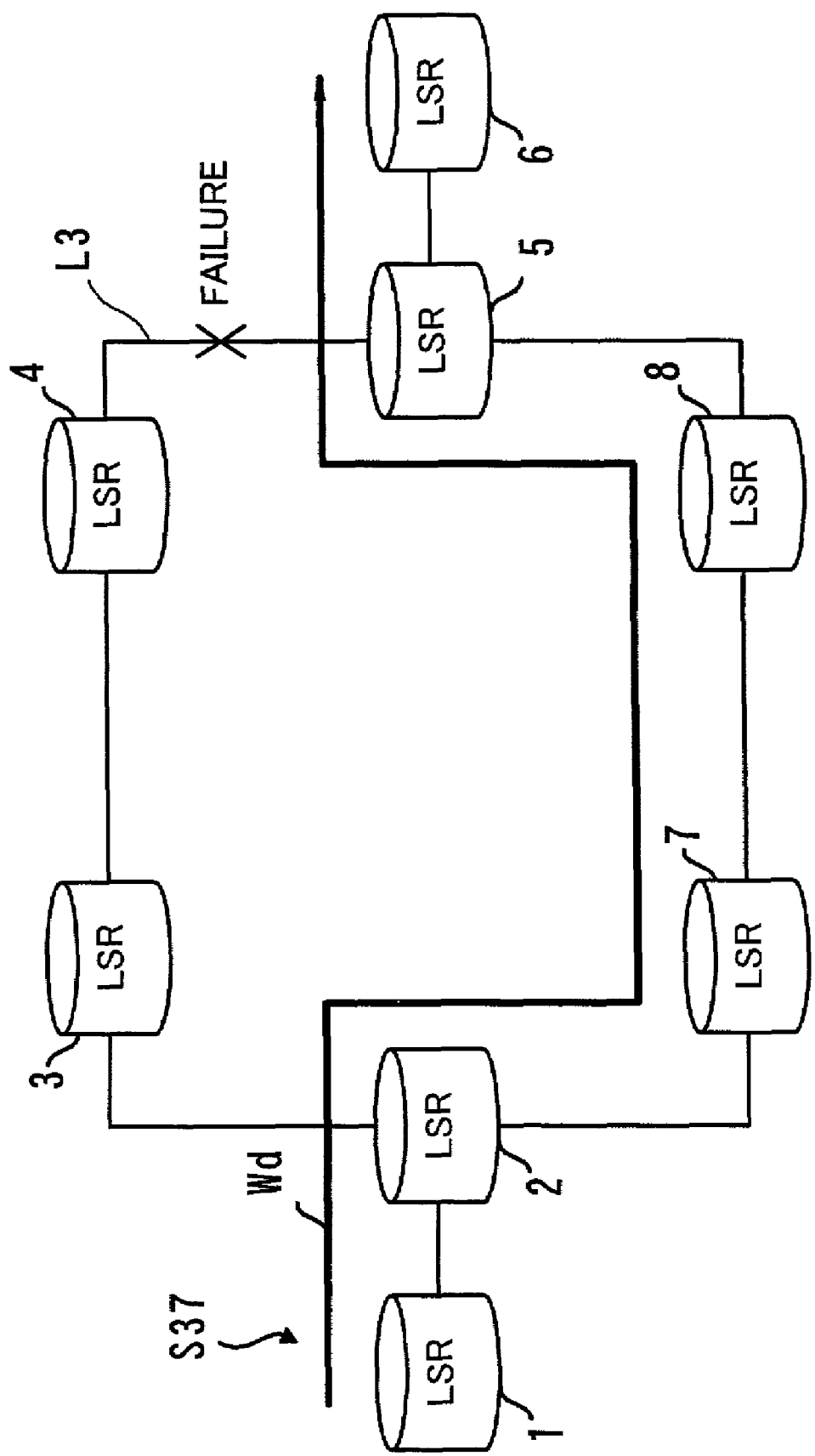

FIGS. 14 to 17 show a failure recovery process of the fourth embodiment of the present invention, dividing it into four parts as follows: step S30 in FIG. 14, steps S31 to S33 in FIG. 15, steps S34 to S36 in FIG. 16, and step S37 in FIG. 17. The illustrated network system includes eight LSRs 1 to 8, where a working path W is established along the route of:

LSR 1→LSR 2→LSR 3→LSR 4→LSR 5→LSR 6, together with one loop-shaped protection path P along the route of:

LSR 3→LSR 2→LSR 7→LSR 8→LSR 5→LSR 4→LSR 3

Label tables are created for those paths through the same procedure as described in the first embodiment.

Suppose here that a failure has occurred in, for example, the link L3 between the LSRs 4 and 5. The fourth embodiment then deals with this link failure as follows:

(S30) The LSRs 4 and 5 detects disruption of the link L3.

(S31) The network system executes the same failure recovery process as in the first embodiment. That is, the LSR 4 reroutes the current working path W to the protection path P, and the LSR 5 connects the protection path P to the rest of the working path W, which results in a detour path Wb shown in FIG. 15.

(S32) The failure recovery controllers 14 in the two LSRs 4 and 5 determine whether they have created a loopback point as a result of step S31. The detour path Wb of FIG. 15 actually has a loopback point at the LSR 4, where packets are simply sent backward, only wasting LSR resources.

(S33) In an attempt to remove itself from the detour path Wb, the loopback point LSR 4 makes its failure recovery controller 14 send a failure notification message to the preceding LSR 3.

(S34) Upon receipt of the notification, the LSR 3 reroutes the current working path Wb to the protection path P according to the same failure recovery method as in the first embodiment. This produces a modified detour path Wc shown in FIG. 16.

(S35) The LSR 3 tests whether it has created a loopback point as a result of step S34. This test makes the LSR 3 recognize the presence of loopback.

(S36) In an attempt to remove itself from the detour path Wc, the loopback point LSR 3 makes its failure recovery controller 14 send a failure notification message to the preceding LSR 2.

(S37) Upon receipt of the notification, the LSR 2 reroutes the working path Wc to the protection path P, using the same failure recovery method as in the first embodiment. This results in a loopback-free detour path Wd shown in FIG. 17.

The above steps permit the LSRs to optimize the detour path, thus saving link resources, as well as alleviating their workloads of packet routing. As such, the fourth embodiment provides more efficient detour paths for failure recovery.

Figure 18:
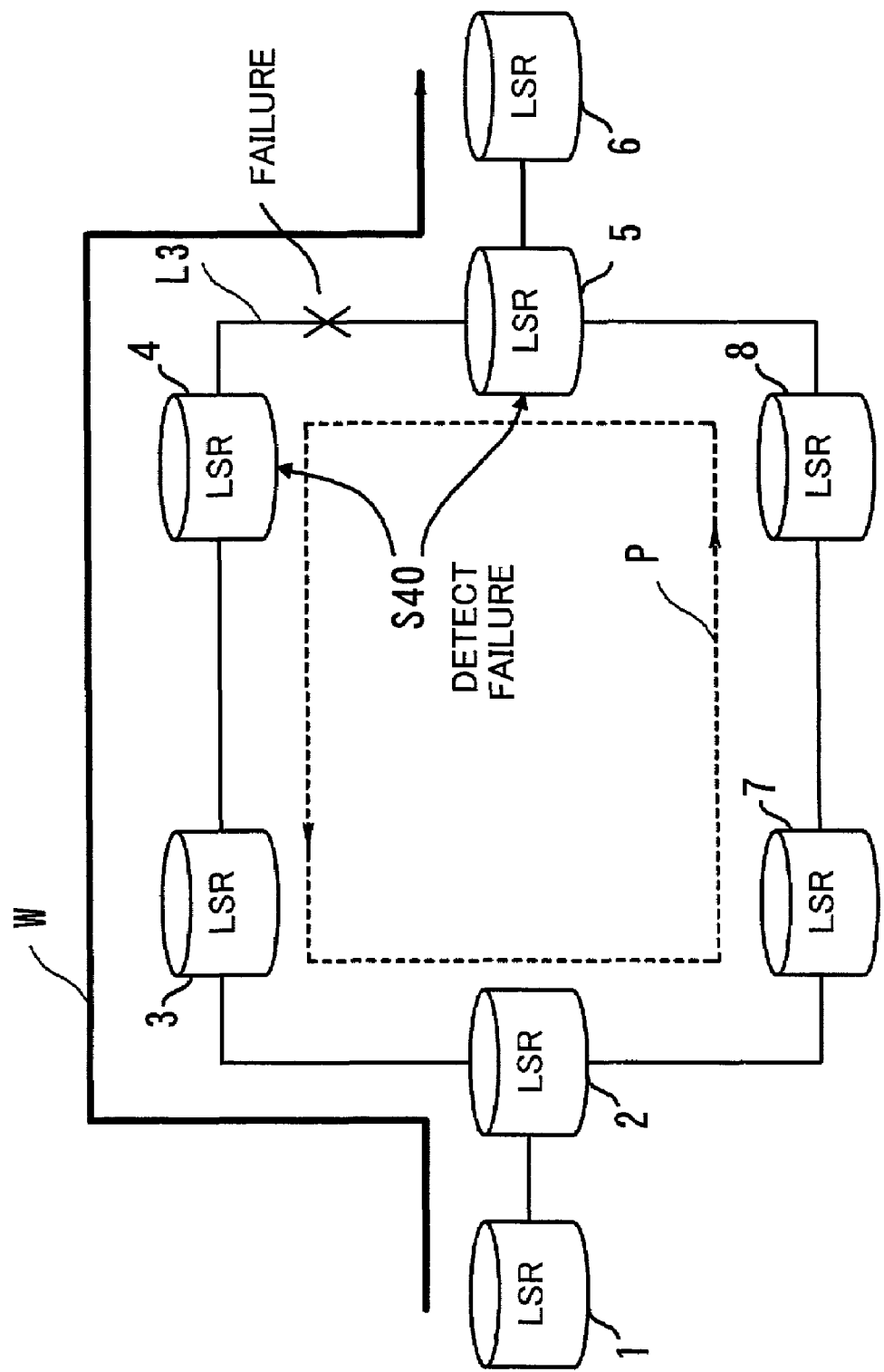
FIGS. 18 to 20 show a variation of the fourth embodiment.
Figure 19:
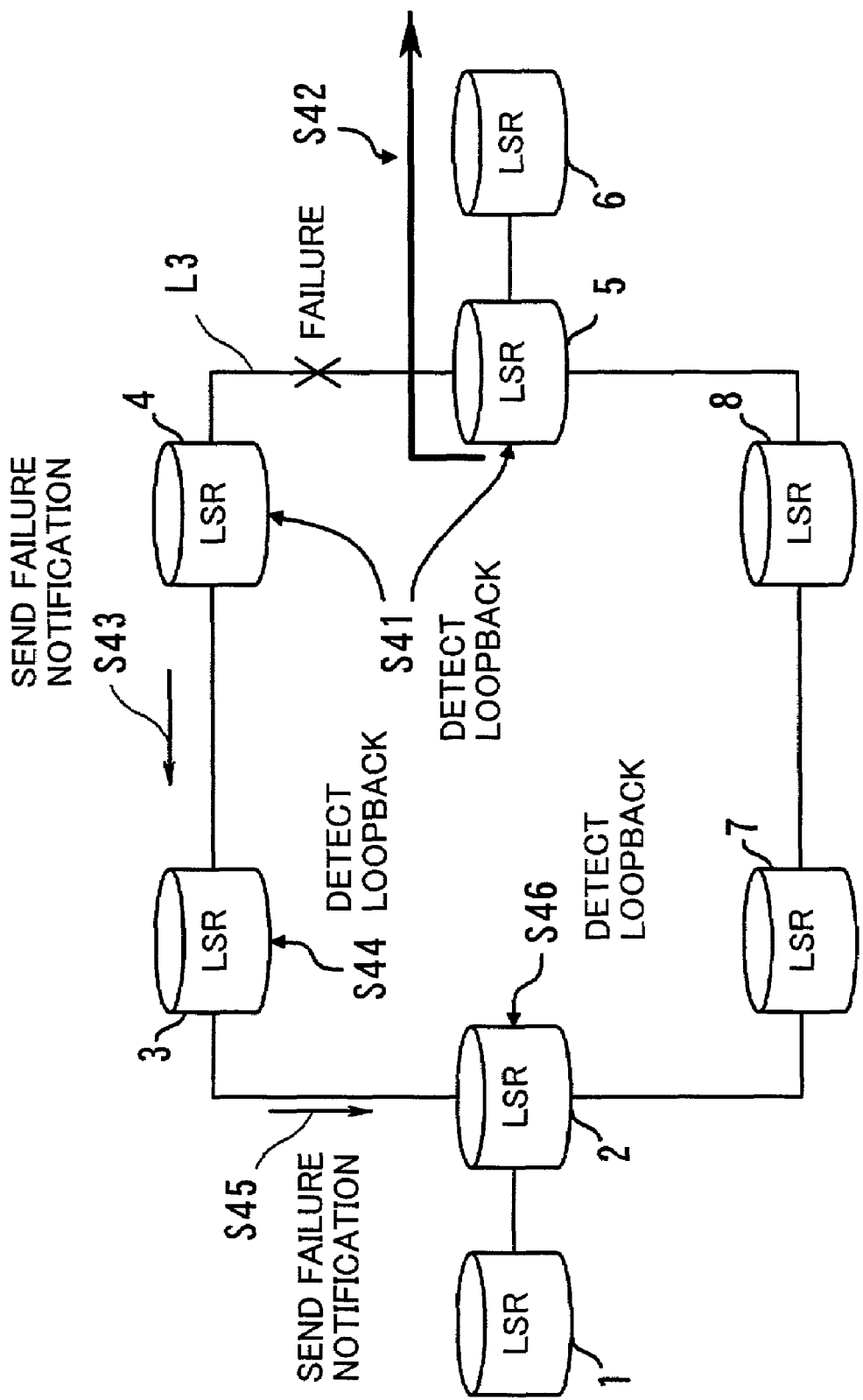
Figure 20:
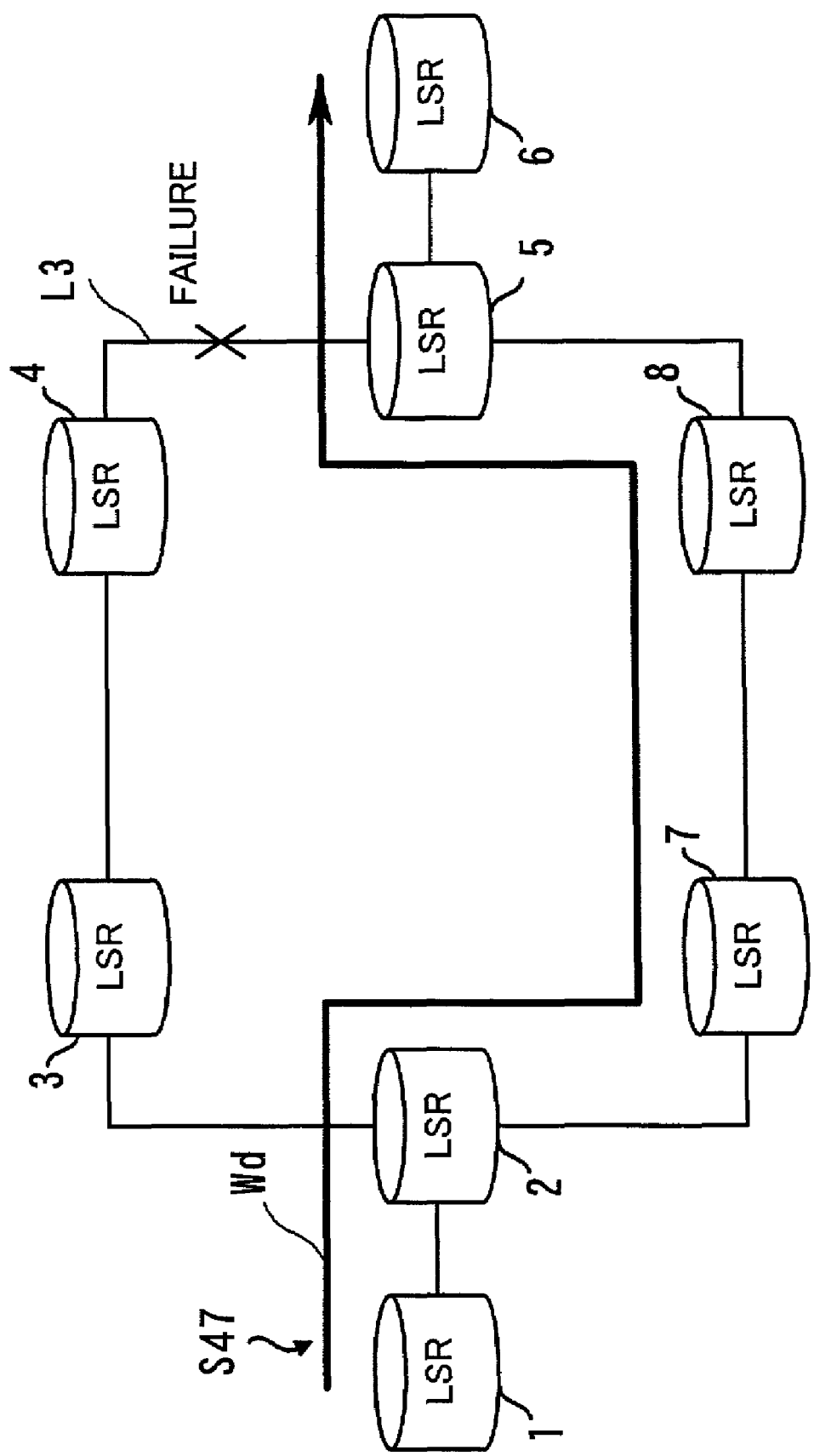

FIGS. 18 to 20 show a variation of the fourth embodiment of the present invention, dividing it into three parts as follows: step S40 in FIG. 18, steps S41 to S46 in FIG. 19, and step S47 in FIG. 20.

When a loopback path is produced as a result of protection switching, the original fourth embodiment detects it in a follow-up process and then truncates it step by step as explained in FIGS. 14 to 17. As opposed to this, the modified version of the fourth embodiment detects every possible loopback proactively when a failure occurs, and thus reaches the same result immediately. More specifically, the system operates as follows:

(S40) The LSRs 4 and 5 detects disruption of the link L3.

(S41) The two LSRs 4 and 5 determine whether they would be a loopback point if the current working path W was switched to the predefined protection path P. In the present situation of FIG. 18, the LSR 4 would find itself as a potential loopback point, while the other LSR 5 would not.

(S42) The LSR 5 switches the working path W to the protection path P, using the same failure recovery method as in the first embodiment.

(S43) To avoid a loopback path, the LSR 4 sends a failure notification message to the preceding LSR 3.

(S44) Upon receipt of the notification, the LSR 3 determines whether it would be a loopback point if the current working path W was switched to the predefined protection path P. In the present situation of FIG. 19, the LSR 3 would recognize itself as a potential loopback point.

(S45) To avoid a loopback path, the LSR 3 sends a failure notification message to the preceding LSR 2.

(S46) Upon receipt of the failure notification, the LSR 2 determines whether it would be a loopback point if the current working path W was switched to the predefined protection path P. In the present case, the LSR 2 would not be a loopback point.

(S47) Accordingly, the LSR 2 reroutes the working path W to the protection path P, using the same failure recovery method as in the first embodiment, thus creating a loopback-free detour path Wd as shown in FIG. 20.

Through the above processing steps, the LSRs immediately create an efficient detour path Wd. The modified version of the fourth embodiment thus saves link resources and avoids unnecessary workloads in packet routing.

Figure 21:
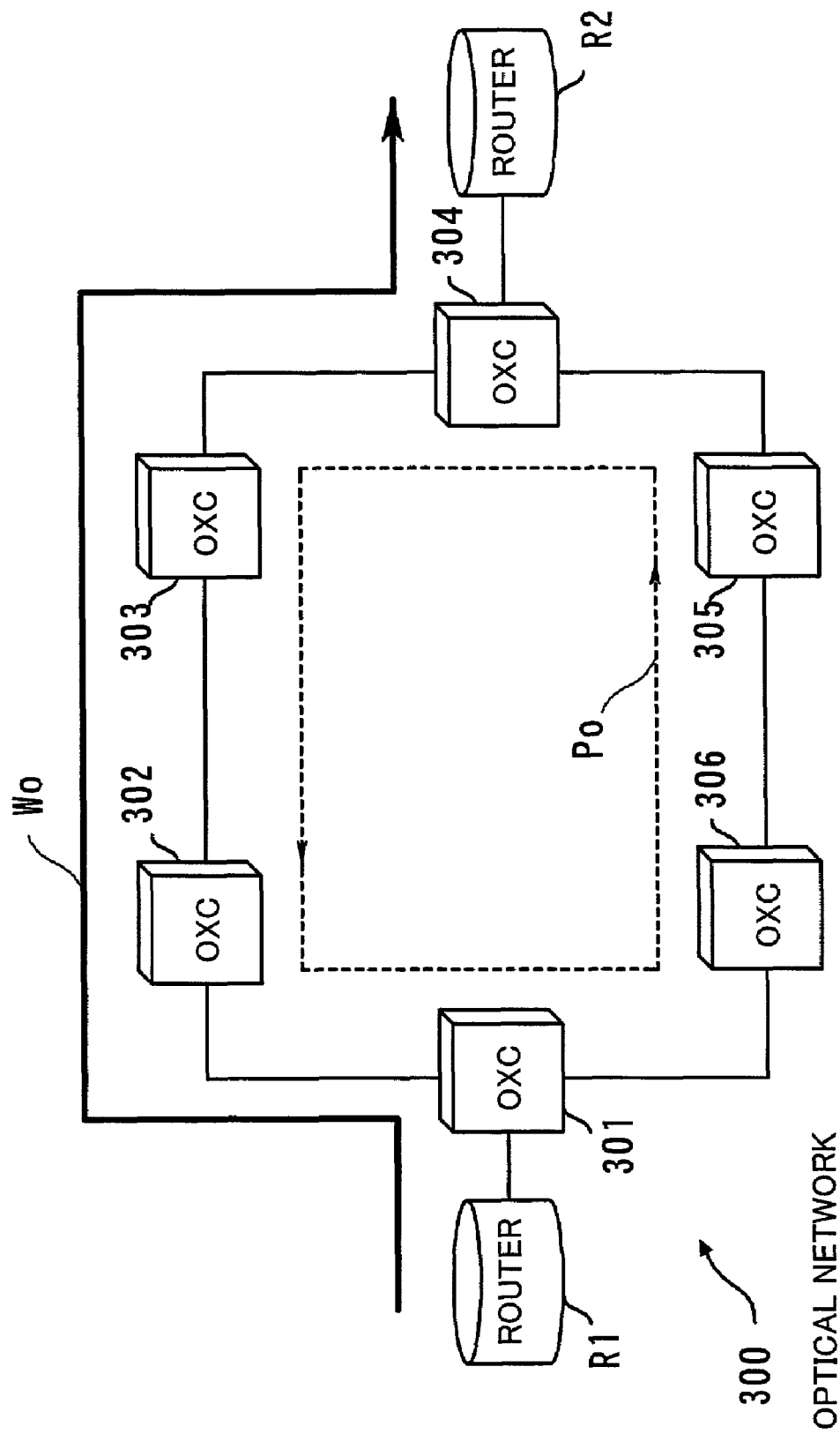
FIG. 21 shows a fifth embodiment of the present invention.
Figure 22:
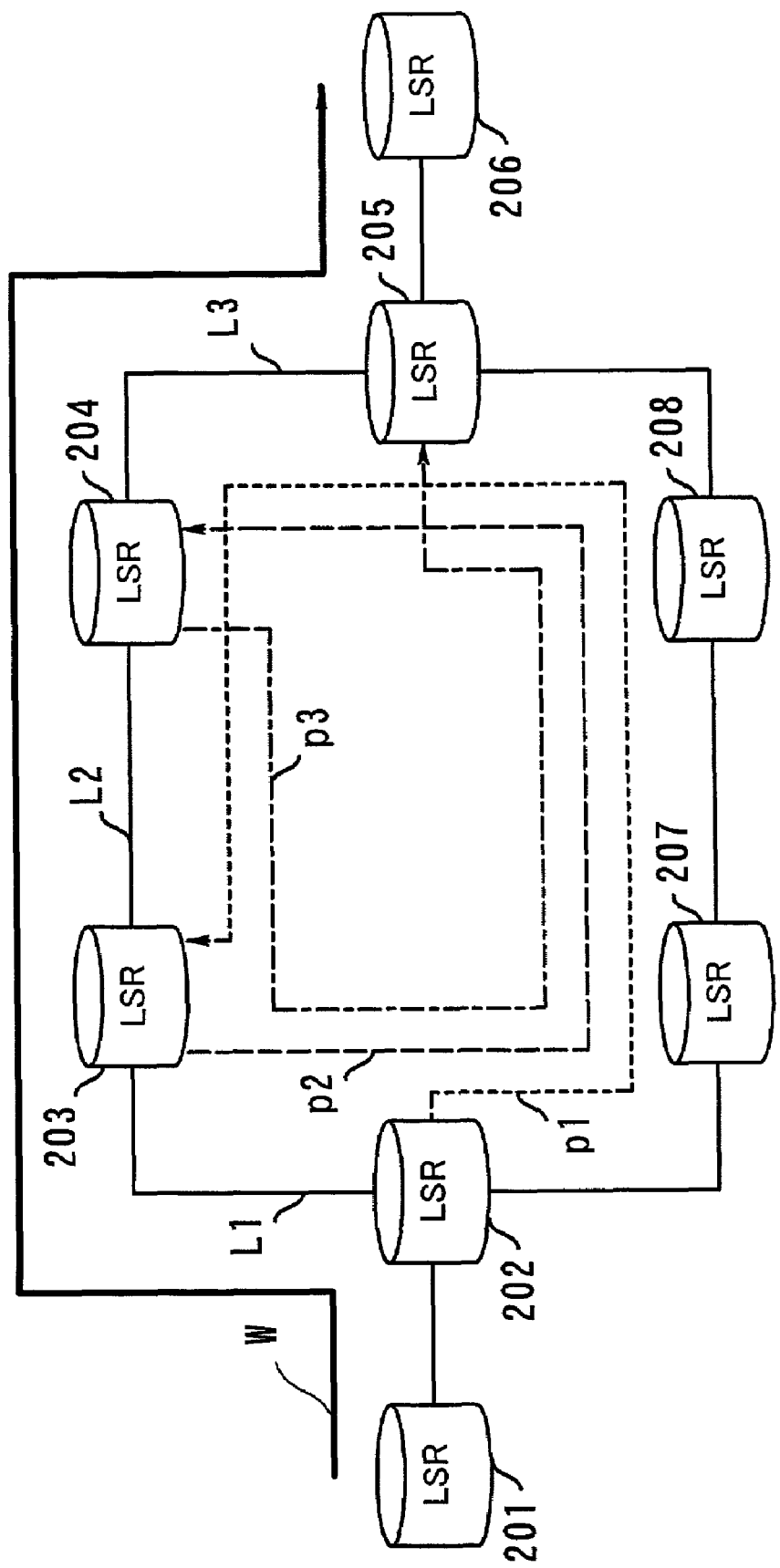
FIGS. 22 to 24 explain a conventional failure recovery mechanism based on local repair techniques.
Figure 23:
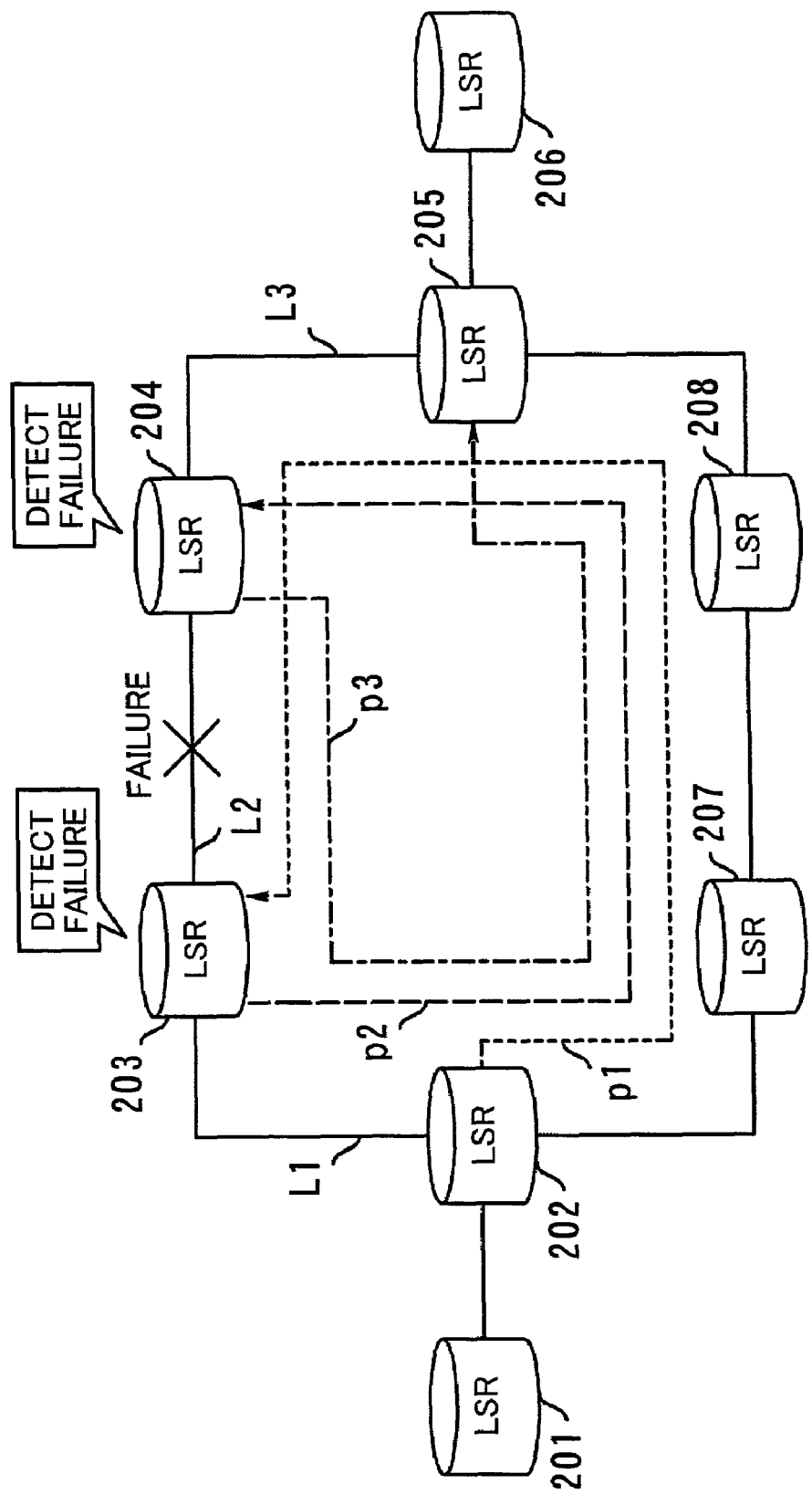
Figure 24:
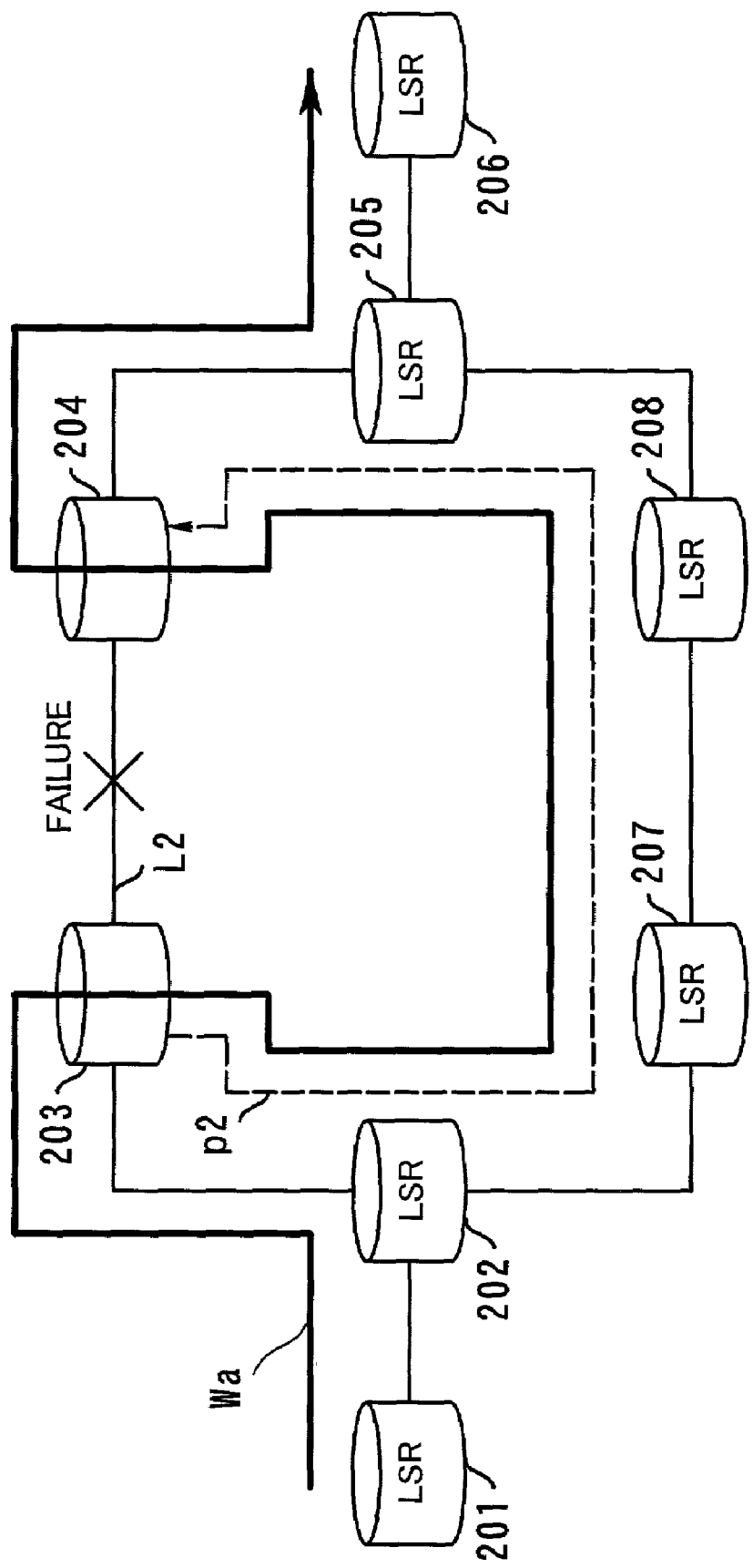

Referring next to FIG. 21, a fifth embodiment of the present invention will be described. This fifth embodiment is an implementation of the present invention in an optical network, where each network element functions as the transmission unit 10 of the invention, and different optical wavelengths play the roles of labels in the proposed failure recovery process.

The illustrated optical network 300 is constructed with routers R1 and R2 and optical cross-connect switches (OXC) 301 to 306, each of which contains the foregoing functions of the proposed transmission unit 10. With fiber-optic transmission media, the six OXCs 301 to 306 are connected in a ring topology, and the routers R1 and R2 are linked to the OXCs 301 and 304, respectively.

In such an optical network 300, the label table manager 11 at each node creates and manages a label table, in which the label of every link is associated with an optical wavelength. The path set-up unit 13 defines a loop-shaped protection optical path Po to back up a given working optical path Wo. The transmission controller 12 controls signal transport over the optical paths.

When a failure occurs, the failure recovery controller 14 reconfigures its local label table by changing the association between optical wavelength labels, thereby switching a part or whole of the working optical path Wo to the protection optical path Po. The failure recovery process in this optical network is similar to what have been described in the MPLS networks. That is, individual optical wavelengths used in each link are handled analogously with the MPLS labels. For detailed operations, refer to the description first embodiment.

While the above fifth embodiment treats optical wavelengths as labels so as to make the present invention work in an optical network. Similar to this, the present invention can also be applied to other types of data communications equipment. The next paragraphs will briefly discuss such applications.

The present invention is applicable to time-division multiplexed data transmission equipment. That is, the transmission unit manages input parameters including incoming time slots and input interface identifiers, in association with output parameters including outgoing time slots and output interface identifiers. This configuration allows the time slots to be handled analogously with the labels in the proposed failure recovery process.

Likewise, the present invention can be applied to data transmission equipment with space switching functions. That is, the transmission unit manages input interface parameters in association with output interface parameters, which allows the interfaces to be handled analogously with the labels in the proposed failure recovery process. More specifically, a space switch has multiple interface ports to provide a plurality of transmission links to a neighboring unit, as opposed the transmission unit discussed in this description, which assumes that one interface is used to link with one neighboring unit. Therefore, by introducing appropriate association between labels and interfaces, the proposed failure recovery mechanism can be applied to such space-switching transmission units.

The above discussion will now be summarized as follows. According to the present invention, a link failure on an existing working path is repaired with a predefined protection path by changing the association between incoming and outgoing labels. For this purpose, the transmission unit creates a loop-shaped protection path that includes a part or whole of transmission links of the working path and would allow transmission data to flow in the opposite direction to that of the working path. The loop-shaped protection path is not dedicated to any particular link, but it can be used to repair a plurality of links that could fail. This is a notable feature of the proposed transmission unit and failure recovery method of the present invention, which advantageously enables efficient use of limited network resources.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A failure control unit with failure recovery functions, comprising:
   label table management means for managing a label table which associates incoming labels related to incoming transmission data with outgoing labels related to outgoing transmission data;
   transmission means for controlling label-switched routing of the incoming transmission data, based on the label table;
   path set-up means for establishing a loop-shaped protection path that includes a part or whole of transmission links of an existing working path and would allow transmission data to flow in the opposite direction to that of the working path; and
   failure recovery means for executing a failure recovery process when a failure occurs on the working path, by changing the association between the incoming and outgoing labels stored in the label table, so as to switch the failed part of the working path to the loop-shaped protection path,
   wherein the path set-up means establishes the loop-shaped protection path by selecting one particular node on the working path and then drawing a closed-loop path that starts from the selected node and returns to the same selected node.

2. The failure control unit according to claim 1, wherein the label table management means manages:
   (a) a working-path label table, each entry of which comprises:
   a working-path input parameter field storing an input interface identifier of the working path and an incoming label associated therewith, and
   a working-path output parameter field storing an output interface identifier of the working path and an outgoing label associated therewith;
   (b) a protection-path label table, each entry of which comprises:
   a protection-path input parameter field storing an input interface identifier of the protection path and an incoming label associated therewith, and
   a protection-path output parameter field storing an output interface identifier of the protection path and an outgoing label associated therewith; and
   (c) a detour-path label table used to define a detour path for bypassing the failed portion of the working path.

3. The failure control unit according to claim 2, wherein:
   when the transmission unit is located upstream of the failed portion of the working path, the failure recovery control means constructs the detour-path label table by combining the working-path input parameter field and the protection-path output parameter field, and performs switching from the working path to the loop-shaped protection path, based on the constructed detour-path label table; and
   when the transmission unit is located downstream of the failed portion of the working path, the failure recovery control means constructs the detour-path label table by combining the working-path output parameter field and the protection-path input parameter field, and performs switching from the loop-shaped protection path to the working path, based on the constructed detour-path label table.

4. The failure control unit according to claim 1, wherein:
   the transmission unit is involved in a plurality of working paths being established along a particular route;
   the label table management means makes the label table include working-path identifiers each assigned to the plurality of working paths; and
   the failure recovery control means associates the established protection path with one of the working-path identifiers, whereby the protection path would be used to repair the working path having that working-path identifier.

5. The failure control unit according to claim 1, wherein:
   the transmission unit is involved in a plurality of working paths being established along a particular route;
   the label table management means makes the label table include a protection-path identifier assigned to the established protection path; and
   the failure recovery control means associates the protection-path identifier with one of the established working paths, whereby the protection path would be used to repair the working path associated with the protection-path identifier.

6. The failure control unit according to claim 1, wherein:
the transmission unit is involved in a plurality of working paths being established along a particular route;
the label table management means makes the label table include priority levels each assigned to the plurality of working paths; and
the failure recovery control means uses the established loop-shaped protection path to repair the working path having a higher priority level.

7. The failure control unit according to claim 1, wherein the failure recovery control means detects a loopback point that has been produced as a result of switching from the working path to the loop-shaped protection path, and eliminates the detected loopback point, one point at a time, until a loopback-free detour path is finally formed.

8. The failure control unit according to claim 1, wherein the failure recovery control means creates a loopback-free detour path by proactively avoiding loopback points that could be produced as a result of switching from the working path to the loop-shaped protection path.

9. A failure control unit with failure recovery functions which restores communication over an optical network, comprising:
label table management means for managing a label table which associates incoming labels related to incoming optical transmission data with outgoing labels related to outgoing optical transmission data, the incoming and outgoing labels being associated with optical wavelengths;
transmission means for controlling switching of the incoming optical transmission data, based on the label table;
optical path set-up means for establishing a loop-shaped protection optical path that includes a part or whole of transmission links of an existing working optical path and would allow transmission data to flow in the opposite direction to that of the working optical path; and
failure recovery means for executing a failure recovery process when a failure occurs on the working optical path, by changing the association between the incoming and outgoing labels stored in the label table, so as to switch the failed part of the working optical path to the loop-shaped protection optical path,
wherein the optical path set-up means establishes the loop-shaped protection optical path by selecting one particular node on the working optical path and then drawing a closed-loop optical path that starts from the selected node and returns to the same selected node.

10. A failure recovery method comprising the steps of:
(a) managing a label table which associates incoming labels related to incoming transmission data with outgoing labels related to outgoing transmission data,
(b1) establishing a loop-shaped protection path that includes a part or whole of transmission links of an existing working path and would allow transmission data to flow in the opposite direction to that of the working path; and (b2) establishing the loop-shaped protection path by selecting one particular node on the working path and then drawing a closed-loop path that starts from the selected node and return to the same selected node; and
(c) executing a failure recovery process when a failure occurs on the working path, by modifying the association between the incoming and outgoing labels stored in the label table, so as to switch the failed path of the working path to the loop-shaped protection path.

11. The failure recovery method according to claim 10, wherein the establishing step (b) establishes the loop-shaped protection path by selecting one particular node on the working path and then drawing a closed-loop path that starts from the selected node and returns to the same selected node.

12. The failure recovery method according to claim 10, wherein the managing step (a) manages:
(a1) a working-path label table, each entry of which comprises:
a working-path input parameter field staring an input interface identifier of the working path and an incoming label associated therewith, and
a working-path output parameter field storing an output interface identifier of the working path and an outgoing label associated therewith,
(a2) a protection-path label table, each entry of which comprises:
a protection-path input parameter field storing an input interface identifier of the loop-shaped protection path and an incoming label associated therewith, and
a protection-path output parameter field storing an output interface identifier of the loop-shaped protection path and an outgoing label associated therewith; and
(a3) a detour-path label table used to define a detour path for bypassing the failed portion of the working path.

13. The failure recovery method according to claim 12, wherein:
an a transmission unit located upstream of the failed portion of the working path, the executing step (c) constructs the detour-path label table by combining the working path input parameter field and the protection-path output parameter field, and performs switching from the working path to the loop-shaped protection path, based on the constructed detour-path label table; and
at another transmission unit located downstream of the failed portion of the working path, the executing step (c) constructs the detour-path label table by combining the working-path output parameter field and the protection-path input parameter field, and performs switching from the loop-shaped protection path to the working path, based on the constructed detour-path label table.

* * * * *